(12) United States Patent
Shouji

(10) Patent No.: US 9,969,876 B2
(45) Date of Patent: May 15, 2018

(54) RESIN COMPOSITION FOR LASER DIRECT STRUCTURING, RESIN MOLDED ARTICLE, AND METHOD OF MANUFACTURING RESIN MOLDED ARTICLE WITH PLATED LAYER

(71) Applicant: Mitsubishi Engineering-Plastics Corporation, Tokyo (JP)

(72) Inventor: Hidekazu Shouji, Kanagawa (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 370 days.

(21) Appl. No.: 14/890,813

(22) PCT Filed: Apr. 18, 2014

(86) PCT No.: PCT/JP2014/061023
§ 371 (c)(1),
(2) Date: Nov. 12, 2015

(87) PCT Pub. No.: WO2014/185217
PCT Pub. Date: Nov. 20, 2014

(65) Prior Publication Data
US 2016/0130436 A1 May 12, 2016

(30) Foreign Application Priority Data

May 13, 2013 (JP) .................................. 2013-100937
Oct. 7, 2013 (JP) .................................. 2013-210002
Oct. 7, 2013 (JP) .................................. 2013-210003

(51) Int. Cl.
| C08G 63/02 | (2006.01) |
| C08L 69/00 | (2006.01) |
| C23C 18/16 | (2006.01) |
| C23C 18/20 | (2006.01) |
| C23C 18/38 | (2006.01) |

(52) U.S. Cl.
CPC .......... *C08L 69/00* (2013.01); *C23C 18/1608* (2013.01); *C23C 18/1612* (2013.01); *C23C 18/1641* (2013.01); *C23C 18/204* (2013.01); *C23C 18/38* (2013.01); *C23C 18/1653* (2013.01)

(58) Field of Classification Search
CPC ........................................................ C08L 69/00
USPC .............................................................. 428/421
See application file for complete search history.

(56) References Cited

U.S. PATENT DOCUMENTS

2014/0002311 A1  1/2014  Takano et al.

FOREIGN PATENT DOCUMENTS

| CN | 102088122 A | 5/2011 |
| JP | 10-130485 A | 5/1998 |
| WO | WO 2009/141799 A1 | 11/2009 |
| WO | WO 2011/076730 A1 | 6/2011 |
| WO | WO 2011/095832 A1 | 8/2011 |
| WO | WO 2012/126831 A1 | 9/2012 |
| WO | WO 2012/128219 A1 | 9/2012 |

OTHER PUBLICATIONS

Chinese Office Action and Search Report dated Nov. 11, 2016, for Chinese Application No. 201480027063.4, with English translation of Chinese Office Action.
International Preliminary Report on Patentability and Written Opinion of the International Searching Authority (Forms PCT/IB/326, PCT/IB/373, PCT/ISA/237 and PCT/IB/338) for International Application No. PCT/JP2014/061023, dated Nov. 26, 2015, with an English translation.
International Search Report and Written Opinion of the International Searching Authority (Forms PCT/ISA/210 and PCT/ISA/237) for International Application No. PCT/JP2014/061023, dated May 27, 2014.
Chinese Office Action, dated Jul. 13, 2017, for corresponding Chinese Application No. 201480027063.4, with an English machine translation.

Primary Examiner — Terressa Boykin
(74) Attorney, Agent, or Firm — Birch, Stewart, Kolasch & Birch, LLP

(57) ABSTRACT

Provided is a resin composition for LSD, having a good flame retardancy, as well as keeping high levels of mechanical strength and platability. The resin composition for laser direct structuring, the resin composition containing: relative to 100 parts by weight of a resin component which contains 65 to 100% by weight of a polycarbonate resin and 35 to 0% by weight of a styrene-based resin, 5 to 40 parts by weight of a glass fiber having a value of average fiber length/ average fiber diameter of 10 or smaller; 0.5 to 10 parts by weight of an elastomer; 5 to 10 parts by weight of a laser direct structuring additive containing antimony and tin; 10 to 30 parts by weight of a phosphorus-containing flame retardant; and, 0.1 to 1 part by weight of polytetrafluoroethylene.

23 Claims, 1 Drawing Sheet

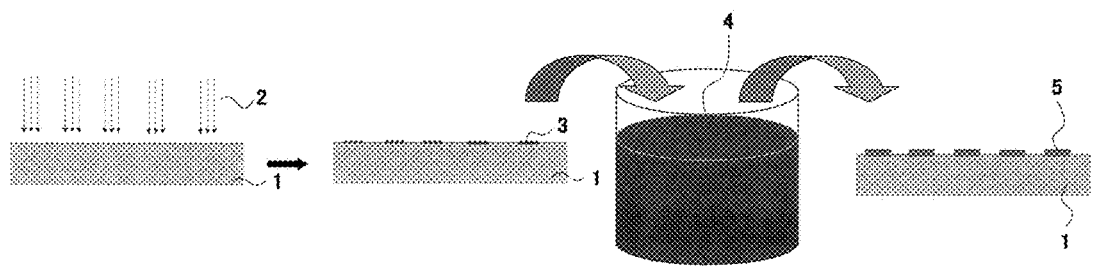

RESIN COMPOSITION FOR LASER DIRECT STRUCTURING, RESIN MOLDED ARTICLE, AND METHOD OF MANUFACTURING RESIN MOLDED ARTICLE WITH PLATED LAYER

TECHNICAL FIELD

This invention relates to a resin composition for laser direct structuring (may simply be referred to as "resin composition", hereinafter). This invention further relates to a resin molded article obtained by molding the resin composition, and a method of manufacturing a resin molded article with a plated layer, having a plated layer formed on the surface thereof.

BACKGROUND ART

Recently, along with the development of cellular phones including smart phone, various methods for manufacturing an antenna inside the cellular phone have been studied. Particularly, a method for manufacturing the antenna which can be three-dimensionally designed inside the cellular phones is required. As one of the techniques for forming the three-dimensional antenna, attention to laser direct structuring (hereinafter may be referred to as "LDS") technique has been paid. The LDS technique is a technique, for example, where the irradiation of a surface of a resin molded article containing an LDS additive with a laser activates only the laser-irradiated portion, and then application of a metal to the activated portion causes a plated layer to form. The feature of this technique is to be capable of manufacturing a metallic structure such as an antenna directly on a surface of resin substrate without using adhesives or the like. Such LDS techniques are disclosed, for example, in Patent documents 1 to 4 and the like.

REFERENCES

Patent Documents

Patent document 1 WO2011/095632 A
Patent document 2 WO2011/076729 A
Patent document 3 WO2011/076730 A
Patent document 4 WO2012/128219 A

SUMMARY OF THE INVENTION

Technical Problem

Now, there has been an increasing need for high flame retardancy also for resin composition for LDS. Meanwhile, the resin composition for LDS is also required to be mechanically strong, and of course to be platable. While LDS additive is necessary for plating, it can also be a foreign matter in the resin molded article. It is therefore an object of this invention to solve the problem, and to provide a resin composition for LSD, having a good flame retardancy, as well as keeping high levels of mechanical strength and platability.

Means to Solve the Problems

As a result of our careful studies under these circumstances, the problems described above were solved by the following means <1>, preferably <2> to <24>.

<1> A resin composition for laser direct structuring, the resin composition comprising: relative to 100 parts by weight of a resin component which contains 65 to 100% by weight of a polycarbonate resin and 35 to 0% by weight of a styrene-based resin, 5 to 40 parts by weight of a glass fiber having a value of average fiber length/average fiber diameter of 10 or smaller; 0.5 to 10 parts by weight of an elastomer; 5 to 10 parts by weight of a laser direct structuring additive containing antimony and tin; 10 to 30 parts by weight of a phosphorus-containing flame retardant; and, 0.1 to 1 part by weight of polytetrafluoroethylene.

<2> The resin composition of <1>, wherein the phosphorus-containing flame retardant contains a phosphazene compound and/or a condensed phosphoric ester.

<3> The resin composition <1> or <2>, the resin composition comprising: relative to 100 parts by weight of the polycarbonate resin, 5 to 40 parts by weight of the glass fiber having a value of average fiber length/average fiber diameter of 10 or smaller; 0.5 to 10 parts by weight of the elastomer; 5 to 10 parts by weight of the laser direct structuring additive containing antimony and tin; 10 to 30 parts by weight of a phosphazene compound; and, 0.1 to 1 part by weight of the polytetrafluoroethylene, wherein a content of an acrylonitrile/butadiene/styrene copolymer in the elastomer is less than 10% by weight, and a content of the acrylonitrile/butadiene/styrene copolymer is less than 10% by weight, relative to a total content of the polycarbonate resin and the acrylonitrile/butadiene/styrene copolymer.

<4> The resin composition of <3>, Which comprises the glass fiber having a value of average fiber length/average fiber diameter of 10 or smaller in a content of 5 to 20 parts by weight, relative to 100 parts by weight of the polycarbonate resin.

<5> The resin composition of <3> or <4>, further comprising 0.5 to 5 parts by weight of titanium oxide, relative to 100 parts by weight of the polycarbonate resin.

<6> The resin composition of any one of <3> to <5>, wherein the resin composition contains substantially no acrylonitrile/butadiene/styrene copolymer.

<7> The resin composition of <1>, wherein the phosphorus-containing flame retardant contains a condensed phosphoric ester.

<8> The resin composition of <7>, wherein a content of blending of the styrene-based resin, in the resin component, is less than 10% by weight.

<9> The resin composition of <1>, wherein the resin component comprises 65 to 90% by weight of the polycarbonate resin and 35 to 10% by weight of the styrene-based resin, and, the phosphorus-containing flame retardant contains 10 to 30 parts by weight of a phosphazene compound, relative to 100 parts by weight of the resin component.

<10> The resin composition of any one of <7> to <9>, which comprises the glass fiber having a value of average fiber length/average fiber diameter of 10 or smaller in a content of 5 to 30 parts by weight, relative to 100 parts by weight of the resin component.

<11> The resin composition of any one of <7> to <10>, further comprising 0.5 to 5 parts by weight of titanium oxide, relative to 100 parts by weight of the resin component.

<12> The resin composition of any one of <1> to <11>, wherein tin is the most abundant ingredient among metal components contained in the laser direct structuring additive.

<13> The resin composition of any one of <1> to <12>, wherein the laser direct structuring additive contains 90% by weight or more of tin oxide, and 3 to 8% by weight of antimony oxide.
<14> The resin composition of any one of <1> to <13>, wherein the laser direct structuring additive contains 0.01 to 0.1% by weight of lead oxide and/or 0.001 to 0.01% by weight of copper oxide.
<15> The resin composition of any one of <1> to <14>, wherein the elastomer is a siloxane-copolymerized elastomer.
<16> The resin composition of any one of <1> to <15>, further comprising a glass fiber having a value of average fiber length/average fiber diameter exceeding 10, whose content being 100% by weight or less relative to the amount of blending of the glass fiber having a value of average fiber length/average fiber diameter of 10 or smaller.
<17> A resin molded article obtained by molding the resin composition described in any one of <1> to <16>.
<18> The resin molded article of <17>, rated V-0 in the UL 94 test at 1.6 mm thickness.
<19> The resin molded article of <17> or <18>, further comprising a plated layer on a surface of the resin molded article.
<20> The resin molded article of any one of <17> to <19>, being a component of a portable electronic device.
<21> The resin molded article of <19> or <20>, wherein the plated layer has antenna performance.
<22> A method of manufacturing a resin molded article with a plated layer, the method comprising irradiating laser to a surface of a resin molded article obtained by forming the resin composition of any one of <1> to <16>, and applying a metal to form the plated layer.
<23> The method of manufacturing a resin molded article with a plated layer of <22>, wherein the plated layer is a copper plated layer.
<24> A method of manufacturing a component for a portable electronic device, the method comprising the method of manufacturing a resin molded article with a plated layer described in <22> or <23>.

Advantageous Effects of Invention

According to this invention, it now becomes possible to provide a resin composition of LDS, having a good flame retardancy, as well as keeping high levels of mechanical strength and platability.

BRIEF DESCRIPTION OF DRAWING

FIG. 1 is a schematic diagram showing a process for plating the surface of a resin molded article.
In FIG. 1, 1 stands for a resin molded article, 2 stands for laser, 3 stands for laser-irradiated portion, 4 stands for plating solution, and 5 stands for plated layer.

THE MOST PREFERRED EMBODIMENTS OF THE INVENTION

The present invention will be explained in detail below. As used herein, each numerical range expressed by two values on both sides of "to" is used to mean the range including the values indicated before and after "to" as lower and upper limits.
In this specification, the term "(meth)acrylate" is defined to mean acrylate and methacrylate, and "(meth)acryl" is defined to mean acryl and methacryl.

The resin composition of this invention characteristically contains, relative to 100 parts by weight of a resin component which contains 65 to 100% by weight of a polycarbonate resin and 35 to 0% by weight of a styrene-based resin, 5 to 40 parts by weight of a glass fiber having a value of average fiber length/average fiber diameter of 10 or smaller; 0.5 to 10 parts by weight of an elastomer; 5 to 10 parts by weight of a laser direct structuring additive containing antimony and tin; 10 to 30 parts by weight of a phosphorus-containing flame retardant; and, 0.1 to 1 part by weight of polytetrafluoroethylene.

As a result of using the glass fiber having a value of average fiber length/average fiber diameter of 10 or smaller (may occasionally be referred to as "short fiber", hereinafter), it now becomes possible to provide a resin composition having a good flame retardancy, as well as keeping high levels of mechanical strength and platability. While the glass fiber has been known as an ingredient to be added to improve the mechanical strength, it is greatly surprising that the flame retardancy is improved by the addition of such glass fiber, especially short fiber.

The resin composition of this invention will be detailed below.

<Resin Component>

The resin composition of this invention contains a resin component.

In the resin composition of this invention, the resin component contains 65 to 100% by weight of a polycarbonate resin and 35 to 0% by weight of a styrene-based resin.

The resin component may contain an additional resin component. The additional resin component, however, preferably accounts for 10% by weight or less relative to the total resin component, and more preferably 5% by weight or less. Only a single species of the resin components may be used, or two or more species of them may be used in combination.

The resin component is preferably embodied according to first to third embodiments of resin component described below.

The first embodiment of resin component in the resin composition of this invention relates to an embodiment where the polycarbonate resin accounts for 40% by weight or more in the total resin component. In the first embodiment, in the total resin component, the polycarbonate resin preferably accounts for 50% by weight or more, more preferably 51% by weight or more, even more preferably 95% by weight or more of the resin component, and in particular the polycarbonate resin accounts for substantially 100% by weight.

The resin component of the first embodiment may contain, for example, polyamide resin, polyester resin, styrene-based resin or the like, besides the polycarbonate resin. It is, however, preferable that the content of these resins is less than 10% by weight of the total resin component, more preferably 5% by weight or less, and even more preferably 3% by weight or less.

When the resin component of the first embodiment is employed, the elastomer preferably contains less than 10% by weight, relative to the total weight, of an acrylonitrile/butadiene/styrene copolymer (ABS resin), and the content of the acrylonitrile/butadiene/styrene copolymer is preferably less than 10% by weight relative to the total content of the polycarbonate resin and the acrylonitrile/butadiene/styrene copolymer. The amount of blending of the acrylonitrile/butadiene/styrene copolymer is preferably 5% by weight or less relative to the total content of the polycarbonate resin and the acrylonitrile/butadiene/styrene copolymer, more preferably 3% by weight or less, even more preferably 1% by weight or less, and in particular substantially not contained. Now "substantially not contained" means that the substance is not intentionally added, but without excluding a contaminant. The ABS resin in this context conceptually includes any ABS resin which can be contained in the elastomer described later.

The resin component of the second embodiment relates to an embodiment where the polycarbonate resin is contained as the resin component, and the styrene-based resin may optionally be contained. When the resin component of the second embodiment is employed, the styrene-based resin is not necessarily contained. For example, for application where a certain level of Charpy impact strength is required, it is optionally possible to control the amount of blending of the styrene-based resin, in the resin component, to less than 10% by weight.

When the resin component of the second embodiment is employed, the resin component preferably accounts for 40% by weight or more of the total resin composition, more preferably accounts for 50% by weight or more, and even more preferably 60% by weight or more.

When the resin component of the second embodiment contains the styrene-based resin, the ratio of the styrene-based resin is preferably 35 to 10% by weight relative to the total resin component, and more preferably 30 to 10% by weight.

The content of the additional resin, other than the polycarbonate resin and styrene-based resin, in the resin component of the second embodiment is preferably 5% by weight or less relative to the total resin component.

The resin component of the third embodiment is exemplified by an embodiment where the polycarbonate resin and the styrene-based resin are contained as the resin component.

When the resin component of the third embodiment is employed, the resin component preferably contains 65 to 90% by weight of the polycarbonate resin and 35 to 10% by weight of the styrene-based resin, and more preferably contains 68 to 90% by weight of the polycarbonate resin and 32 to 10% by weight of the styrene-based resin.

The resin component of the third embodiment may contain an additional resin component other than the polycarbonate resin and the styrene-based resin. The content of the additional resin is, however, preferably 5% by weight or less relative to the total resin component.

The polycarbonate resin and the styrene-based resin will be detailed below.

<<Polycarbonate Resin>>

The polycarbonate resin used in this invention is not specifically limited, for which any of aromatic polycarbonate, aliphatic polycarbonate, and aromatic-aliphatic polycarbonate may be used. Among them, preferable is the aromatic polycarbonate, and more preferable is a thermoplastic aromatic polycarbonate polymer or copolymer obtained by a phosgene method, or a reaction of an aromatic dihydroxy compound with a carbonate diester.

The aromatic dihydroxy compound is exemplified by 2,2-bis(4-hydroxyphenyl)propane (=bisphenol A), tetramethylbisphenol A, bis(4-hydroxyphenyl)-p-diisopropyl benzene, hydroquinone, resorcinol, and 4,4-dihydroxydiphenyl, and is preferably exemplified by bisphenol A. Moreover, for the purpose of preparing a composition with a high level of flame retardancy, usable is a compound having one or more tetraalkylphosphonium sulfonate bound to the above-described aromatic dihydroxy compound, or a polymer or oligomer with a siloxane structure, having phenolic OH groups on both terminals.

Preferable examples of the polycarbonate resin used in this invention include polycarbonate resin derived from 2,2-bis(4-hydroxyphenyl)propane; and polycarbonate copolymer derived from 2,2-bis(4-hydroxyphenyl)propane and other aromatic dihydroxy compound.

The molecular weight of the polycarbonate resin is preferably 14,000 to 30,000 in terms of viscosity average molecular weight, which is converted from the viscosity of solution using methylene chloride as the solvent and measured at 25° C., more preferably 15,000 to 28,000, and even more preferably 16,000 to 26,000. With the viscosity average molecular weight controlled in these ranges, the mechanical strength will further be improved, the moldability will further be improved, and this proves the advantage.

A method of manufacturing the polycarbonate resin is not specifically limited. The polycarbonate resin manufactured by any method such as phosgene process (interfacial polymerization), melt process (transesterification) or the like, may be used in this invention. Also a polycarbonate resin manufactured by the ordinary melt process, followed by modification of the content of the terminal OH groups, may be used in this invention.

The polycarbonate resin used in this invention is not only the one available as a virgin material, but also may be the one recycled from waste products, typically collected by so-called material recycling.

As for more about the polycarbonate resin usable in this invention, for example, the description in paragraphs [0018] to [0066] of JP-A-2012-72338 may be referred to, the contents of which are incorporated into this specification.

The resin composition of this invention may contain a single species of the polycarbonate resins, or two or more species of them.

<<Styrene-Based Resin>>

The styrene-based resin refers to at least one polymer selected from the group consisting of styrene-based polymer composed of styrene-based monomer, copolymer of such styrene-based monomer with other copolymerizable vinyl-based monomer, and copolymer obtained by polymerizing such styrene-based monomer or such styrene-based monomer with other copolymerizable vinyl-based monomer in the presence of a rubber-like polymer. Among them, it is preferable to use the copolymer obtained by polymerizing such styrene-based monomer or such styrene-based monomer with other copolymerizable vinyl-based monomer in the presence of a rubber-like polymer.

Specific examples of the styrene-based monomer include styrene, and styrene derivatives such as α-methylstyrene, p-methylstyrene, divinylbenzene, ethylvinylbenzene, dimethylstyrene, p-t-butylstyrene, bromostyrene, and dibromostyrene, among them styrene is preferable. Only a single species of these compounds may be used, or two or more species may be used in combination.

The vinyl-based monomer copolymerizable with the styrene-based monomer described above is exemplified by vinylcyan compounds such as acrylonitrile and methacrylonitrile; alkyl acrylates such as methyl acrylate, ethyl acrylate, propyl acrylate, butyl acrylate, amyl acrylate, hexyl acrylate, 2-ethylhexyl acrylate, octyl acrylate and cyclohexyl acrylate; alkyl methacrylates such as methyl methacrylate, ethyl methacrylate, propyl methacrylate, butyl methacrylate, amyl methacrylate, hexyl methacrylate, 2-ethylhexyl methacrylate, octyl methacrylate and cyclohexyl methacrylate; aryl acrylates such as phenyl acrylate and benzyl acrylate; aryl methacrylates such as phenyl methacrylate and benzyl methacrylate; epoxy group-containing acrylates or methacrylates such as glycidyl acrylate and glycidyl methacrylate; maleimide-based monomers such as maleimide, N,N-methylmaleimide and N-phenylmaleimide; and α,β-unsaturated carboxylic acids and anhydrides thereof such as acrylic acid, methacrylic acid, maleic acid, maleic anhydride, fumaric acid and itaconic acid.

The rubber-like polymer copolymerizable with the styrene-based monomer is exemplified by polybutadiene; polyisoprene; styrene-butadiene random copolymer and block copolymer; acrylonitrile-butadiene random copolymer and block copolymer; acrylonitrile-butadiene copolymer; copolymer of alkyl acrylate or alkyl methacrylate with butadiene; polybutadiene-polyisoprene diene-based copolymer; copolymers of ethylene and α-olefin such as ethylene-isoprene random copolymer and block copolymer, and ethylene-butene random copolymer and block copolymer; copolymers of ethylene and α,β-unsaturated carboxylate ester such as ethylene-methacrylate copolymer and ethylene-butyl acrylate copolymer; ethylene-vinyl acetate copolymer; ethylene-propylene-nonconjugated diene terpolymers such as ethylene-propylene-hexadiene copolymer; acryl-based rubber; and composite rubber composed of polyorganosiloxane rubber and polyalkyl acrylate or methacrylate rubber.

This sort of styrene-based resin is exemplified by styrene resin, high impact polystyrene (HIPS), acrylonitrile-styrene copolymer (AS resin), acrylonitrile-butadiene-styrene copolymer (ABS resin), methyl methacrylate-acrylonitrile-butadiene-styrene copolymer (MABS resin), acrylonitrile-styrene-acryl rubber copolymer (ASA resin), acrylonitrile-ethylene propylene-based rubber-styrene copolymer (AES resin), styrene-methyl methacrylate copolymer (MS resin), and styrene-maleic anhydride copolymer.

Among them, acrylonitrile-styrene copolymer (AS resin), acrylonitrile-butadiene-styrene copolymer (ABS resin), acrylonitrile-styrene-acryl rubber copolymer (ASA resin), and acrylonitrile-ethylene propylene-based rubber-styrene copolymer (AES resin) are preferable; acrylonitrile-butadiene-styrene copolymer (ABS resin), acrylonitrile-styrene-acryl rubber copolymer (ASA resin), and acrylonitrile-ethylene propylene-based rubber-styrene copolymer (AES resin) are more preferable; and acrylonitrile-butadiene-styrene copolymer (ABS resin) is particularly preferable.

The above described styrene-based resin may be manufactured by any method selectable from emulsion polymerization, solution polymerization, block polymerization, suspension polymerization and block-suspension polymerization. In this invention, the styrene-based polymer, styrene-based random copolymer, or block copolymer is preferably manufactured by block polymerization, suspension polymerization or block-suspension polymerization; and the styrene-based graft copolymer is preferably manufactured by block polymerization, block-suspension polymerization or emulsion polymerization.

The acrylonitrile-butadiene-styrene copolymer (ABS resin), which is particularly preferably used in this invention, refers to a mixture of a thermoplastic graft copolymer which is composed of a butadiene rubber component graft-polymerized with acrylonitrile and styrene, and an acrylonitrile-styrene copolymer. The butadiene rubber component preferably accounts for 5 to 40% by weight, relative to 100% by weight of ABS resin component, more preferably accounts for 10 to 35% by weight, and particularly accounts for 13 to 25% by weight. The size of rubber particle is preferably 0.1 to 5 μm, more preferably 0.2 to 3 μm, even more preferably 0.3 to 1.5 μm, and particularly 0.4 to 0.9 μm. The size distribution of rubber particle may be uni-modal, or multimodal characterized by two or more peaks.

The resin composition of this invention may contain only a single species of the styrene-based resins, or two or more species of them.

As described above, the resin composition of this invention may contain, for example, polyamide resin, polyester resin or the like, besides the polycarbonate resin and styrene-based resin. Only a single species of such resins may be used, or two or more species of them may be used in combination.

In the resin composition of this invention, the resin component preferably accounts for 40% by weight or more relative to the total composition, more preferably accounts for 50% by weight or more, and even more preferably accounts for 60% by weight or more.

<Glass Fiber (Short Fiber)>

The resin composition of this invention contains the glass fiber (short fiber) having a value of (average fiber length)/(average fiber diameter) (Aspect ratio) of 10 or smaller. As a result of using such short fiber, the flame retardancy of the resin composition of this invention may be improved. It also becomes possible to effectively improve the anisotropy and outer appearance. The aspect ratio of short fiber is preferably 8 or smaller, more preferably 7 or smaller, meanwhile, preferably 2.5 or larger, and more preferably 3 or larger. If the aspect ratio exceeds 10, the warpage or anisotropy may increase, and the outer appearance of the produce will tend to degrade.

The short fiber used in this invention is preferably a milled fiber of glass fiber. The milled fiber refers to a milled product of chopped strand of glass fiber which is obtained by chopping a strand of glass fiber, composed of several tens to several thousands of sized glass short fibers (filament), into a predetermined length. The chopped strand of glass fiber used here is preferably surface-treated with a sizing agent described later.

The average fiber diameter of the short fiber used in this invention is preferably 1 to 25 μm, and more preferably 5 to 17 μm. With the average fiber diameter controlled to 1 μm or larger, the moldability will tend to improve. Meanwhile, with the average fiber diameter controlled to 25 μm or smaller, the outer appearance will improve, and the reinforcing effect is further enhanced. The average fiber length is preferably 1 to 500 μm, more preferably 10 to 300 μm, and even more preferably 20 to 200 μm.

The average fiber diameter of the short fiber used in this invention is given in number average fiber diameter, and the average fiber length is given in number average fiber length in a pellet of this invention.

The short fiber suitably used in this invention may have either circular cross section or modified cross section, among which the short fiber having a circular cross section is more preferable. As a result of using the short fiber having a circular cross section, the obtainable molding will have an improved weld strength.

The short fiber used in this invention includes those composed of A-glass, C-glass and E-glass, among which E-glass (non-alkali glass) is preferable from the viewpoint that it will not adversely affect the polycarbonate resin.

The above-described sizing agent used for surface treatment of the chopped strand of glass fiber, from which the milled glass fiber is produced, is not specifically limited, and may be exemplified by the sizing agent of urethane-based, epoxy-based, acryl-based, polyester-based, styrene-based and olefin-based. Among the sizing agent, the urethane-based and epoxy-based sizing agents are preferable, and the epoxy-based sizing agent is more preferable.

The amount of coating of the sizing agent, relative to 100% by weight of glass fiber, is typically 0.1 to 3% by weight, and preferably 0.2 to 1% by weight.

The amount of blending of the short fiber in the resin composition, relative to 100 parts by weight of resin component, is 5 parts by weight or more, preferably 10 parts by weight or more, more preferably 12 parts by weight or more, and even more preferably 15 parts by weight or more. Meanwhile the amount of blending of the short fiber in the resin composition, relative to 100 parts by weight of the resin component, is 40 parts by weight or less, preferably 35 parts by weight or less, and more preferably 30 parts by weight or less.

In particular, when the resin component of the first embodiment is employed, the amount of blending of the short fiber in the resin composition, relative to 100 parts by weight of the polycarbonate resin, is preferably 5 to 40 parts by weight, more preferably 5 to 35 parts by weight, and even more preferably 5 to 30 parts by weight. With the amount of blending of the short fiber controlled to 30 parts by weight or less relative to 100 parts by weight of the polycarbonate resin, not only the flame retardancy, but also the platability will tend to improve.

When the resin component of the second embodiment or the resin component of the third embodiment is employed, the amount of blending of the short fiber in the resin composition, relative to 100 parts by weight of the resin component is preferably 5 to 40 parts by weight, more preferably 10 to 40 parts by weight, even more preferably 12 to 40 parts by weight, and particularly 15 to 40 parts by weight. In particular, with the amount of blending of the short fiber controlled to 40 parts by weight or less, relative to 100 parts by weight of the resin component, not only the flame retardancy, but also the platability will tend to improve.

The resin composition of this invention may contain only a single species of the short fiber, or two or more species. When two or more species are used, the total content falls in the above-described ranges.

<Other Glass Fibers>

The resin composition of this invention may contain a glass fiber other than the short fiber described above. The glass fiber other than the short fiber has a value of average fiber length/average fiber diameter exceeding 10. By mixing such other glass fiber, the flexural modulus and the flexural strength may be improved more effectively. The glass fiber, having a value of (average fiber length)/(average fiber diameter) exceeding 10, preferably has a value of (average fiber length)/(average fiber diameter) of 11 to 60.

The average fiber length of the other glass fiber used in this invention is preferably 50 to 450 µm, and more preferably 100 to 300 µm. Meanwhile, the average fiber diameter is preferably 3 to 18 µm, and more preferably 5 to 14 µm. Such other glass fiber is exemplified by "glass roving". This sort of glass fiber is easily available from Asahi Fiber Glass Co., Ltd. under the trade names of "Glaslon chopped strand" and "Glaslon milled fiber". Glass fibers having different geometries may be used in combination.

The other glass fiber may have any composition selected from A-glass, C-glass, E-glass and so forth, among which E-glass (non-alkali glass) is particularly preferable.

The other glass fiber suitably used in this invention may have either circular cross section or modified cross section, among which the one having a circular cross section is more preferable. As a result of using the other glass fiber having a circular cross section, the obtainable molding will have an improved weld strength.

The other glass fiber may be surface-treated with a silane coupling agent such as γ-methacryloxypropyl trimethoxysilane, γ-glycidoxypropyl trimethoxysilane or γ-aminopropyl triethoxysilane, wherein the amount of adhesion of which is typically 0.01 to 1% by weight relative to the weight of glass fiber. It is also possible to optionally use the glass fibers surface-treated with a lubricant such as fatty acid amide compound or silicone oil; antistatic agent such as quaternary ammonium salt; film-forming resin such as epoxy resin or urethane resin; or a mixture of film-forming resin with heat stabilizer, flame retarder or the like.

The amount of the other glass fiber, when blended into the resin composition of this invention, is preferably 100% by weight or less relative to the amount of blending of the short fiber, and more preferably 80 to 100% by weight. With such configuration, the flexural modulus and the flexural strength may be improved more effectively.

Meanwhile, when the resin composition of this invention is intended for applications where the effect of the flexural modulus or flexural strength is not specifically required, the amount of blending of the other glass fiber may be 5% by weight or less. It is even possible to configure the resin composition so as to contain substantially no other glass fiber. Now the phrase of "to contain substantially no the other glass fiber" means that the other glass fiber is not intentionally added. This will, therefore, not exclude unintended contamination of the other glass fiber.

In particular, when the resin component of the first embodiment is employed, the amount of blending of the other glass fiber in the resin composition, if blended, is preferably 100% by weight or less relative to the amount of blending of the short fiber, and more preferably 80 to 100% by weight.

When the resin component of the second embodiment is employed, it is also preferable that the content of the other glass fiber is 50% by weight or less relative to the amount of blending of the short fiber. It is even possible to configure the resin composition so as to contain substantially no other glass fiber.

When the resin component of the third embodiment is employed, the amount of blending of the other glass fiber in the resin composition, if blended, is preferably 100% by weight or less relative to the amount of blending of the short fiber, and more preferably 10 to 50% by weight relative to the amount of blending of the short fiber. Conversely, for applications where the effect of the flexural modulus or flexural strength is not specifically required, the content of the other glass fiber may be controlled to 5% by weight or less.

The resin composition of this invention may contain only a single species of, or two or more species of, the other glass fiber. When two or more species are used, the total content falls in the above-described ranges.

In the resin composition of this invention, it is usually preferable that the resin component and the glass fiber (the total of the short fiber and the other glass fiber) collectively account for 70% by weight or more of the total component.

<Elastomer>

The resin composition of this invention contains the elastomer. With the elastomer contained therein, the resin composition will be improved in the impact resistance. The elastomer used in this invention is exemplified by methyl methacrylate-butadiene-styrene copolymer (MBS resin); methyl methacrylate-butadiene rubber copolymer (MB resin); styrene-butadiene-based triblock copolymers called SBS and SEBS, and hydrogenated products thereof; styrene-isoprene-based triblock copolymers called SPS and SEPS, and hydrogenated products thereof; olefinic thermoplastic elastomer called TPO; polyester-based elastomer; siloxane-based rubber; acrylate-based rubber; and siloxane copolymer elastomer. The elastomers usable here include those described in paragraphs [0075] to [0088] of JP-A-2012-251061, and those described in paragraphs [0101] to [0107] of JP-A-2012-177047, the contents of which are incorporated into this specification. In this invention, MBS resin, MB resin or siloxane-copolymerized elastomer is particularly preferable, and siloxane copolymer elastomer is more preferable.

(Siloxane-Copolymerized Elastomer)

The siloxane-copolymerized elastomer used in this invention is preferably a silicone-acrylic composite rubber which contains polyorganosiloxane and polyalkyl (meth)acrylate, and may also be a graft copolymer obtained by optionally grafting a vinyl-based polymer composed of one or more species of vinyl-based compound monomers.

The basic polymer structure is referred to a multi-layered polymer having an inner core layer in which polyorganosiloxane, as a crosslinking component having a low glass transition temperature, and polyalkyl (meth)acrylate are entangled with each other, and an outer shell layer composed of a vinyl-based polymer which is composed of one or more species of vinyl-based compound monomers. The vinyl-based polymer which configures the shell has an effect of improving the adhesiveness with a matrix component of the resin composition. This sort of graft copolymer may be manufactured by a method disclosed, for example, in JP-A-2004-359889.

While the polyorganosiloxane used for manufacturing the silicone-acrylic composite rubber is not specifically limited, it is preferable to use, for example, a polymer which contains a dimethylsiloxane unit as the constitutive unit. The dimethylsiloxane which configures the polyorganosiloxane is exemplified by three-membered or larger dimethylsiloxane-based cyclic compounds, wherein three- to seven-membered cyclic compounds are preferable. Specifically exemplified are hexamethylcyclotrisiloxane, octamethylcyclotetrasiloxane, decamethylcyclopentasiloxane, and dodecamethylcyclohexasiloxane. Only a single species of these compounds may be used independently, or two or more species may be used in combination. Among them, from the viewpoint of easiness in controlling the particle size distribution, octamethylcyclotetrasiloxane is preferably used as the major ingredient.

The polyorganosiloxane may contain, as the constituent, a siloxane which contains a vinyl polymerizable functional group, or may be crosslinked with a siloxane-based crosslinking agent. Also there are no special limitations on methods of manufacturing the polyorganosiloxane, and methods of manufacturing the graft copolymer. As for these methods, the description in paragraphs [0055] to [0080] of JP-A-2012-131934 may be referred to, the contents of which are incorporated into this specification.

The number average particle size of the polyorganosiloxane is preferably 10 nm or larger, more preferably 50 nm to 5 μm, and even more preferably 100 nm to 3 μm. With the number average particle size of the polyorganosiloxane controlled to 10 nm or larger, the polyalkyl (meth)acrylate will not be too excessive in the silicone-acrylic composite rubber, and thereby the impact resistance may be suppressed from being degraded.

The polyalkyl (meth)acrylate used for manufacturing the silicone-acrylic composite rubber refers to a polymer having an alkyl (meth)acrylate unit.

The alkyl (meth)acrylate is exemplified by alkyl acrylates such as methyl acrylate, ethyl acrylate, n-propyl acrylate, n-butyl acrylate, and 2-ethylhexyl acrylate; and alkyl methacrylates such as methyl methacrylate, hexyl methacrylate, 2-ethylhexyl methacrylate, and n-lauryl methacrylate. Only a single species of these compounds may be used independently, or two or more species may be used in combination.

The polyalkyl (meth)acrylate may alternatively be a copolymer which contains a multi-functional monomer unit as the constituent. The multifunctional monomer is exemplified by allyl methacrylate, ethylene glycol dimethacrylate, propylene glycol dimethacrylate, 1,3-butylene glycol dimethacrylate, 1,4-butylene glycol dimethacrylate, triallyl cyanurate, and triallyl isocyanurate. Only a single species of these compounds may be used independently, or two or more species may be used in combination.

The content of the multifunctional monomer, when used, is preferably, but not specifically limited to, 0.1 to 2% by weight relative to 100% by weight of polyalkyl (meth)acrylate, and more preferably 0.3 to 1% by weight. With the content of the multifunctional monomer controlled to 0.1% by weight or more, the composite rubber will more easily be suppressed from being degraded in the impact strength due to morphological changes, meanwhile with the content of the multifunctional monomer controlled to 2% by weight or less, the impact strength will tend to improve.

In this invention, the siloxane-copolymerized elastomer is preferably a graft copolymer composed of polyorganosiloxane-polyalkyl (meth)acrylate composite rubber grafted with alkyl methacrylate polymer, or a graft copolymer composed of polyorganosiloxane-polyalkyl (meth)acrylate composite rubber grafted with acrylonitrile-styrene copolymer. These graft copolymers are marketed from Mitsubishi Rayon Co., Ltd. under the trade name of "Metablene S Series". "S-2030", for example, is preferably used.

In the resin composition of this invention, the amount of blending of the elastomer, relative to 100 parts by weight of the resin component, is preferably 0.5 to 10 parts by weight, more preferably 1 to 8 parts by weight, and even more preferably 3 to 7 parts by weight.

When the resin component of the first embodiment is employed, the amount of blending of the elastomer preferably falls in the above-described ranges, relative to 100 parts by weight of the polycarbonate resin.

The resin composition of this invention may contain only a single species of elastomer, or may contain two or more species. When two or more species are used, the total content falls within the above-described ranges.

<Laser Direct Structuring Additive (LDS Additive)>

The LDS additive used in this invention characteristically contains antimony and tin. It is preferable that, among metal components to be blended into the LDS additive, tin is the most prevailing component, and antimony comes to the next. It is preferable that lead and/or copper is additionally contained. Either lead or copper may be contained, or both of them may be contained. In a preferable embodiment, for example, tin is the most prevailing component, antimony comes to the next, lead comes as the next most abundant metal component, and copper comes as the next most abundant metal component.

The LDS additive in this invention refers to a compound capable of inducing plating, when 4 parts by weight of such compound, supposed to act as an LDS additive, is added to 100 parts by weight of a polycarbonate resin (Iupilon (registered trademark) S-3000F, from Mitsubishi Engineering-Plastics Corporation), the mixture is irradiated by YAG laser of 1064 nm wavelength, at an output power of 10 W, a frequency of 80 kHz, and at a rate of scanning of 3 m/s, and then subjected to plating in an electroless plating bath M-Copper 85 from MacDermid Incorporated, so as to apply the metal onto the laser-irradiated surface. The LDS additive used in this invention may be a synthesized product, or may be a commercially available product. The commercially available product is not only the one marketed as the LDS additive, but is also the one marketed for other purposes so long as it satisfies the requirements of the LDS additive in this invention.

The metal component contained in the LDS additive used in this invention is preferably itemized by 90% by weight or more of tin, 5% by weight or more of antimony, and lead and/or copper as trace component (s); and is more preferably itemized by 90% by weight or more of tin, 5 to 9% by weight of antimony, 0.01 to 0.1% by weight of lead, and 0.001 to 0.01% by weight of copper. The upper limit of the content of tin in the metal component contained in the LDS additive is preferably, but not specifically limited to, 95% by weight or below, more preferably 94.99% by weight or below, and even more preferably 94% by weight or below. Also the upper limit of the content of antimony in the metal component contained in the LDS additive is preferably, but again not specifically limited to, 10% by weight or below, more preferably 9.99% by weight or below, and even more preferably 9% by weight or below.

More specifically, the LDS additive used in this invention preferably contains 90% by weight or more of tin oxide, and 3 to 8% by weight of antimony oxide, and additionally 0.01 to 0.1% by weight of lead oxide and/or 0.001 to 0.01% by weight of copper oxide. A particularly preferable embodiment relates to an embodiment of using the LDS additive which contains 90% by weight or more of tin oxide, 3 to 8% by weight of antimony oxide, 0.01 to 0.1% by weight of lead oxide, and 0.001 to 0.01% by weight of copper oxide; and even more preferably embodiment relates to an embodiment of using the LDS additive which contains 93% by weight or more of tin oxide, 4 to 7% by weight of antimony oxide, 0.01 to 0.05% by weight of lead oxide, and 0.001 to 0.006% by weight of copper oxide. The upper limit of the amount of blending of tin oxide in the LDS additive used in this invention is preferably, but not specifically limited to, 96.99% by weight or less, and more preferably 95.989% by weight or less.

The LDS additive used in this invention may contain a trace amount of additional metal other than lead and/or copper. The additional metal is exemplified by indium, iron, cobalt, nickel, zinc, cadmium, silver, bismuth, arsenic, manganese, chromium, magnesium and calcium. These metals may exist in the form of oxides. The content of each of these metals is preferably 0.001% by weight or less, relative to the metal component contained in the LDS additive.

The particle size of the LDS additive is preferably 0.01 to 50 μm, and more preferably 0.05 to 30 μm. With such configuration, uniformity of the state of surface, when applied with plating, will tend to improve.

The amount of blending of the LDS additive in the resin composition of this invention is 5 to 10 parts by weight relative to 100 parts by weight of the resin component, and preferably 5 to 8 parts by weight. As a result of blending of talc, a sufficient level of platability may be obtained, even if the amount of blending of the LDS additive is suppressed to a lower level (for example, 3 to 7 parts by weight relative to 100 parts by weight of the resin component). When the resin component of the first embodiment is employed, the amount of blending the LDS additive, relative to 100 parts by weight of the polycarbonate resin, preferably falls in the above-described ranges.

The resin composition of this invention may contain a single species of the polycarbonate resins, or two or more species of them. When two or more species are contained, the total content preferably falls in the above-described ranges.

<Talc>

The resin composition of this invention may contain talc. As a result of blending of the talc in this invention, the platability in a portion irradiated with laser will tend to improve.

The talc used in this invention is also preferably surface-treated with at least one species of compound selected from polyorganohydrogen siloxanes and organopolysiloxanes. In this case, the amount of adhesion of the siloxane compound is preferably 0.1 to 5% by weight relative to the talc.

When the resin composition of this invention contains the talc, the amount of blending of the talc is preferably 1 to 30 parts by weight relative to 100 parts by weight of the resin component, and more preferably 2 to 10 parts by weight. When the talc is surface-treated, the total weight after the surface treatment preferably falls in the above-described ranges. When the resin component of the first embodiment is employed, the amount of blending of the talc, relative to 100 parts by weight of the polycarbonate resin, preferably falls in the above-described range.

<Phosphorus-Containing Flame Retardant>

The resin composition of this invention contains a phosphorus-containing flame retardant. As a result of blending of the phosphorus-containing flame retardant, the flame retardancy may be improved.

The phosphorus-containing flame retardant preferably contains a phosphazene compound and/or a condensed phosphoric ester.

When the above-described resin component of the first embodiment and the resin component of the third embodiment are employed as the resin component, the phosphorus-containing flame retardant preferably contains the phosphazene compound. Meanwhile, when the above-described resin component of the second embodiment is employed as the resin component, the phosphorus-containing flame retardant preferably contains the condensed phosphoric ester.

The phosphazene compound and the condensed phosphoric ester will be detailed below.

The phosphazene compound is an organic compound having a —P=N— bond in the molecule, and is preferably at least one compound selected from the group consisting of a cyclic phosphazene compound represented by formula (1) below, a chain-like phosphazene compound represented by formula (2) below, and a crosslinked phosphazene compound in which at least one phosphazene compound selected from the group consisting of the compounds represented by formula (1) and formula (2) below is crosslinked with a crosslinking group.

[Chemical Formula 1]

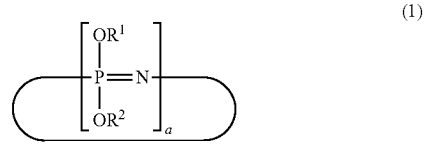

(1)

In formula (1), "a" represents an integer of 3 to 25, $R^1$ and $R^2$ may be same or different, and each of which represents an alkyl group, cycloalkyl group, alkenyl group, alkynyl group, aryloxy group, amino group, hydroxy group, aryl group or alkylaryl group.

[Chemical Formula 2]

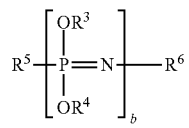

(2)

In formula (2), b represents an integer of 3 to 10000, $R^3$ and $R^4$ may be same or different, and each of which represents an alkyl group, cycloalkyl group, alkenyl group, alkynyl group, aryloxy group, amino group, hydroxy group, aryl group or alkylaryl group.

$R^5$ represents at least one species selected from —N=P$(OR^3)_3$ group, —N=P$(OR^4)_3$ group, —N=P(O)$OR^3$ group, and —N=P(O)$OR^4$ group; and $R^6$ represents at least one species selected from —P$(OR^3)_4$ group, —P$(OR^4)_4$ group, —P(O)$(OR^3)_2$ group, and —P(O)$(OR^4)_2$ group.

In formula (1) and formula (2), the alkyl group is exemplified by methyl group, ethyl group, propyl group, isopropyl group, butyl group, t-butyl group, pentyl group, hexyl group, octyl group, decyl group, and dodecyl group; among which alkyl groups having 1 to 6 carbon atoms, such as methyl group, ethyl group, propyl group, isopropyl group, butyl group, t-butyl group, pentyl group and hexyl group, are preferable in general; and alkyl groups having 1 to 4 carbon atoms, such as methyl group, ethyl group and propyl group, are particularly preferable.

The cycloalkyl group is exemplified by cycloalkyl groups having 5 to 14 carbon atoms such as cyclopentyl group and cyclohexyl group, and among them cycloalkyl groups having 5 to 8 carbon atoms are preferable.

The alkenyl group is exemplified by those having 2 to 8 carbon atoms such as vinyl group and allyl group, meanwhile the cycloalkenyl group is exemplified by those having 5 to 12 carbon atoms such as cyclopentyl group and cyclohexyl group.

The alkynyl group is exemplified by those having 2 to 8 carbon atoms such as ethynyl group and propynyl group; and aryl group such as ethynylbenzene group.

The aryl group is exemplified by those having 6 to 20 carbon atoms such as phenyl group, methylphenyl (or, tolyl) group, dimethylphenyl (or, xylyl) group, trimethylphenyl group and naphthyl group, among them the aryl groups having 6 to 10 carbon atoms are preferable, and phenyl group is particularly preferable.

The alkylaryl group is exemplified by aralkyl groups having 6 to 20 carbon atoms such as benzyl group, phenetyl group and phenylpropyl group, and among them aralkyl groups having 7 to 10 carbon atoms are preferable, and benzyl group is particularly preferable.

Among them, compounds in which each of $R^1$ and $R^2$ in formula (1), and each of $R^3$ and $R^4$ in formula (2) represents an aryl group or arylalkyl group is preferable. As a result of using such aromatic phosphazene, the resin composition will effectively be improved in the thermal stability. From this point of view, each of $R^1$, $R^2$, $R^3$ and $R^4$ more preferably represents an aryl group, and particularly represents a phenyl group.

The cyclic and/or chain-like phosphazene compound represented by formulae (1) and (2) are exemplified by phenoxyphosphazene; (poly) tolyloxyphosphazenes such as o-tolyloxyphosphazene, m-tolyloxyphosphazene and p-tolyloxyphosphazene; (poly) xylyloxyphosphazenes such as o,m-xylyloxyphosphazene, o,p-xylyloxyphosphazene and m,p-xylyloxyphosphazene; o,m,p-trimethylphenyloxyphosphazene; (poly)phenoxytolyloxyphosphazenes such as phenoxy o-tolyloxyphosphazene, phenoxy m-tolyloxyphosphazene and phenoxy p-tolyloxyphosphazene; (poly) phenoxytolyloxyxylyloxyphosphazenes such as phenoxy o,m-xylyloxyphosphazene, phenoxy o,p-xylyloxyphosphazene and phenoxy m,p-xylyloxyphosphazene; and phenoxy o,m,p-trimethylphenyloxyphosphazene, wherein cyclic and/or chain-like phenoxyphosphazenes are preferable.

As the cyclic phosphazene compound represented by formula (1), cyclic phenoxyphosphazene having a phenyl group for each of $R^1$ and $R^2$ is particularly preferable. This sort of cyclic phenoxyphosphazene compound is exemplified by phenoxycyclotriphosphazene, octaphenoxycyclotetraphosphazene and decaphenoxycyclopentaphosphazene, which are obtained typically by allowing ammonium chloride and phosphorus pentachloride to react at 120 to 130° C. to obtain a mixture of cyclic and straight-chain chlorophosphazenes; isolating therefrom cyclic chlorophosphazenes which include hexachlorocyclotriphosphazene, octachlorocyclotetraphosphazene, decachlorocyclopentaphosphazene and so forth; followed by substitution with phenoxy groups. The cyclic phenoxyphosphazene compound is preferably such that "a" in formula (1) represents an integer of 3 to 8, and may even be a mixture of compounds having different values for "a".

The average of "a" is preferably 3 to 5, and more preferably 3 or 4. Particularly preferable is a mixture of 50% by weight or more of compound with a=3, 10 to 40% by weight of compound with a=4, and 30% by weight or less in total of compounds with a=5 or larger.

As the chain-like phosphazene compound represented by formula (2), a chain-like phenoxyphosphazene having a phenyl group for each of $R^3$ and $R^4$ is particularly preferable. This sort of chain-like phenoxyphosphazene compound is exemplified by a compound which is typically obtained by subjecting hexachlorocyclotriphosphazene, obtained as described above, to ring-opening polymerization at 220 to 250° C., and then substituting the obtained straight-chain dichlorophosphazene having a degree of polymerization of 3 to 10000, with phenoxy groups. The straight-chain phenoxyphosphazene compound preferably has a value of "b" in formula (2) of 3 to 1000, more preferably 3 to 100, and even more preferably 3 to 25.

The crosslinked phosphazene compound is exemplified by compounds having crosslinked structures of 4,4'-diphenylene group, which include compounds having crosslinked structures of 4,4'-sulfonyldiphenylene (or, bisphenol S residue); compounds having crosslinked structures of 2,2-(4,4'-diphenylene)isopropylidene group; compounds having crosslinked structures of 4,4'-oxydiphenylene group; and compounds having crosslinked structure of 4,4'-thiodiphenylene group.

As the crosslinked phosphazene compound, it is preferable to use, from the viewpoint of flame retardancy, a crosslinked phenoxyphosphazene compound configured by crosslinking the cyclic phenoxyphosphazene compound, having a phenyl group for each of $R^1$ and $R^2$ in formula (1), with the crosslinking group, or, a crosslinked phenoxyphosphazene compound configured by crosslinking the chain-like phenoxyphosphazene compound, having a phenyl group for each of $R^3$ and $R^4$ in formula (2), with the crosslinking group is preferable, and it is more preferable to use the crosslinked phenoxyphosphazene compound configured by crosslinking the cyclic phenoxyphosphazene compound with the crosslinking group.

The content of phenylene group in the crosslinked phenoxyphosphazene compound is typically 50 to 99.9% by weight, and preferably 70 to 90% by weight, relative to the total number of phenyl group and phenylene group in the cyclic phosphazene compound represented by formula (1) and/or the chain-like phenoxyphosphazene compound represented by formula (2). The crosslinked phenoxyphosphazene compound preferably has no free hydroxy group in the molecule.

In this invention, the phosphazene compound is preferably at least one species selected from the group consisting of cyclic phenoxyphosphazene compound represented by formula (1), and crosslinked phenoxyphosphazene compound configured by crosslinking the cyclic phenoxyphosphazene compound represented by formula (1) with the crosslinking group, from the viewpoint of flame retardancy and mechanical characteristics of the resin composition.

The condensed phosphoric ester is preferably represented by formula (1) below.

[Chemical Formula 3]

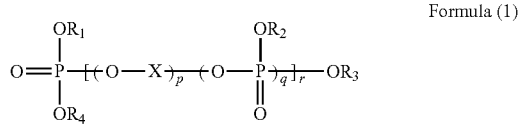

Formula (1)

(In the formula, each of $R_1$, $R_2$, $R_3$ and $R_4$ independently represents a hydrogen atom or organic group, but excluding the case where all of $R_1$, $R_2$, $R_3$ and $R_4$ represent hydrogen atom. X represents a divalent organic group, p represents 0 or 1, q represents an integer of 1 or larger, and r represents an integer of 0, or 1 or larger.)

In formula (1) above, the organic group is exemplified by alkyl group, cycloalkyl group and aryl group, each of which having, or not having a substituent, where the substituent is exemplified by alkyl group, alkoxy group, alkylthio group, aryl group, aryloxy group, arylthio group, halogen atom, and halogenated aryl group. Any group configured by combining these substituents, and, any group configured by combining these substituent using an oxygen atom, sulfur atom, nitrogen atom or the like are also acceptable. The divalent organic group refers to a divalent or higher-valent group produced by eliminating one carbon atom from any of the above-described organic groups. It is exemplified by alkylene group, phenylene group, substituted phenylene group, and polynuclear phenylene group typically derived from bisphenols.

Specific examples of the condensed phosphoric ester represented by formula (1) include trimethyl phosphate, triethyl phosphate, tributyl phosphate, trioctyl phosphate, triphenyl phosphate, tricresyl phosphate, tricresylphenyl phosphate, octyldiphenyl phosphate, diisopropyl phenyl phosphate, tris(chloroethyl)phosphate, tris(dichloropropyl) phosphate, tris(chloropropyl)phosphate, bis(2,3-dibromopropyl)phosphate, bis(2,3-dibromopropyl)-2,3-dichlorophosphate, bis(chloropropyl)monooctyl phosphate, bisphenol A tetraphenyl phosphate, bisphenol A tetracresyl diphosphate, bisphenol A tetraxylyl diphosphate, hydroquinonetetraphenyl diphosphate, hydroquinonetetracresyl phosphate, and hydroquinonetetraxylyl diphosphate.

The commercialized condensed phosphoric esters include those from Daihachi Chemical Industry Co., Ltd. under the trade names of "CR733S" (resorcinol bis(diphenyl phosphate)), "CR741" (bisphenol A bis(diphenyl phosphate)) and "PX-200" (resorcinol bis(dixylylenyl phosphate)); and those from ADEKA Corporation under the trade names of "ADK STAB FP-700" (phenol condensate of 2,2-bis(p-hydroxyphenyl)propane.trichlorophosphine oxide polycondansate (degree of polymerization=1 to 3)), which are readily available.

The amount of blending of the phosphorus-containing flame retardant is preferably 10 parts by weight or more, relative to 100 parts by weight of the resin component, more preferably 12 parts by weight or more, even more preferably 13 parts by weight or more, yet more preferably 15 parts by weight or more, and furthermore preferably 20 parts by weight or more. The amount of blending of the phosphorus-containing flame retardant is preferably 30 parts by weight or less, relative to 100 parts by weight of the resin component, more preferably 29 parts by weight or less, even more preferably 28 parts by weight or less, yet more preferably 25 parts by weight or less, and furthermore preferably 23 parts by weight or less.

In particular, when the resin component of the first embodiment is employed, the amount of blending of the phosphorus-containing flame retardant (preferably phosphazene compound) is preferably 10 to 30 parts by weight relative to 100 parts by weight of the polycarbonate resin, more preferably 10 to 25 parts by weight, and even more preferably 13 to 23 parts by weight.

When the resin component of the second embodiment is employed, the amount of blending of the phosphorus-containing flame retardant (preferably condensed phosphoric ester) is preferably 10 to 30 parts by weight relative to 100 parts by weight of the resin component, more preferably 15 to 30 parts by weight, and even more preferably 20 to 29 parts by weight.

When the resin component of the third embodiment is employed, the amount of blending of phosphorus-containing flame retardant (preferably phosphazene compound) is preferably 10 to 30 parts by weight relative to 100 parts by weight of the resin component, more preferably 12 to 28 parts by weight, and even more preferably 15 to 25 parts by weight.

The resin composition of this invention may contain only a single species of the phosphorus-containing flame retardant, or may contain two or more species. When two or more species are contained, the total content falls within the above-described ranges.

<Polytetrafluoroethylene>

The resin composition of this invention contains polytetrafluoroethylene (PTFE). The polytetrafluoroethylene is preferably the one capable of forming fibril. The polytetrafluoroethylene capable of forming fibril is classified into Type 3 according to the ASTM Standards. The polytetrafluoroethylene capable of forming fibril is exemplified by Teflon (registered trademark) 6-J from Du Pont-Mitsui Fluorochemicals Co., Ltd.; and Polyflon F201L, FA500B and FA500C from Daikin Industries Ltd. Other examples include water-base dispersion of polytetrafluoroethylene Fluon D-1 from Daikin Industries Ltd., and polytetrafluoroethylene compound having a multi-layered structure, obtained by polymerizing vinyl-based monomers. Both types may be used for the resin composition of this invention.

In order to further improve the outer appearance of the molding obtained by injection molding of the polytetrafluoroethylene-containing resin composition, it is possible to use a specific coated polytetrafluoroethylene which is coated with an organic polymer (may occasionally be abbreviated as coated polytetrafluoroethylene, hereinafter). The specific coated polytetrafluoroethylene is characterized in that the ratio of content of polytetrafluoroethylene in the coated polytetrafluoroethylene falls in the range from 40 to 95% by weight, preferably from 43 to 80% by weight, more preferably from 45 to 70% by weight, and particularly from 47 to 60% by weight. Examples of the specific coated polytetrafluoroethylene usable here include Metablene A-3800, A-3700 and KA-5503 from Mitsubishi Rayon Co., Ltd, and Poly TS AD001 from Pacific Interchem Corporation.

The amount of blending of polytetrafluoroethylene in the resin composition of this invention is 0.1 to 1 part by weight relative to 100 parts by weight of the resin component, more preferably 0.2 to 0.9 parts by weight, and particularly 0.3 to 0.8 parts by weight. Note that, as for the coated polytetrafluoroethylene, the amount of addition corresponds to the amount of pure polytetrafluoroethylene. The flame retardant effect will be insufficient if the amount of blending of the polytetrafluoroethylene is less than 0.1 parts by weight, meanwhile the outer appearance of molding may degrade if the amount of blending exceeds one part by weight.

When the resin component of the first embodiment is employed, the amount of blending of the polytetrafluoroethylene, relative to 100 parts by weight of the polycarbonate resin, preferably falls in the above-described ranges.

The resin composition of this invention may contain only a single species of the polytetrafluoroethylene, or two or more species. When two or more species are contained, the total content falls in the above-described ranges.

<Titanium Oxide>

The resin composition of this invention preferably contains titanium oxide.

Among commercially available titanium oxides, those containing 80% by weight or more of titanium oxide is preferably used, taking whiteness and concealability into account. Titanium oxide used in this invention is exemplified by titanium monoxide (TiO), dititanium trioxide ($Ti_2O_3$), and titanium dioxide ($TiO_2$). While any of them may be used, titanium dioxide is preferable. Titanium oxide having a rutile-type crystal structure is suitably used.

When the resin composition contains titanium oxide, the amount of blending of titanium oxide is preferably 0.5 to 5 parts by weight relative to 100 parts by weight of the resin component, and more preferably 1.0 to 4 parts by weight.

In particular, when the resin component of the first embodiment is employed, the amount of blending of titanium oxide, relative to 100 parts by weight of the polycarbonate resin, preferably falls in the above-described ranges.

The resin composition of this invention may contain only a single species of titanium oxide, or two or more species. When two or more species are used, the total content falls in the above-described ranges.

<Organophosphorus Stabilizer>

The resin composition of this invention preferably contains an organophosphorus stabilizer. As a result of blending of the organophosphorus stabilizer, the polycarbonate resin will be less likely to be degraded by the LDS additive, thereby the effect of this invention will more efficiently be demonstrated. As for the organophosphorus stabilizer, the description in paragraphs [0073] to [0095] of JP-A-2009-35691 may be referred to, the contents of which are incorporated into this specification. More preferable organophosphorus stabilizer is represented by formula (3) below.

Formula (3)

(In formula (3), each R represents an alkyl group or aryl group, and (R)s may be mutually same or different. m represents an integer of 0 to 2.)

R preferably represents an alkyl group having 1 to 30 carbon atoms, or an aryl group having 6 to 30 carbon atoms, and more preferably an alkyl group having 2 to 25 carbon atoms, phenyl group, nonylphenyl group, stearylphenyl group, 2,4-di-tert-butylphenyl group, 2,4-di-tert-butylmethylphenyl group, and tolyl group.

In particular, phosphoric ester represented by formula (3') below is preferable.

In formula (3'), each R' represents an alkyl group having 2 to 25 carbon atoms, and (R')s may be mutually same or different. m' is 1 or 2. The alkyl group is exemplified by octyl group, 2-ethylhexyl group, isooctyl group, nonyl group, isononyl group, decyl group, isodecyl group, dodecyl group, tridecyl group, isotridecyl group, tetradecyl group, hexadecyl group, and octadecyl group, among which tetradecyl group, hexadecyl group and octadecyl group are preferable, and octadecyl group is particularly preferable.

The phosphoric ester is exemplified by trimethyl phosphate, triethyl phosphate, tributyl phosphate, trioctyl phosphate, triphenyl phosphate, tricresyl phosphate, tris(nonylphenyl)phosphate, 2-ethylphenyldiphenyl phosphate, tetrakis(2,4-di-tert-butylphenyl)-4,4-diphenylene phosphonite, monostearyl acid phosphate, and distearyl acid phosphate.

As phosphite, also compounds represented by formula (4) below are preferable.

[Chemical Formula 4]

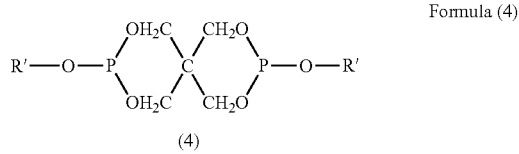

(In formula (4), each R' represents an alkyl group or aryl group, and (R')s may be mutually same or different.)

R' preferably represents an alkyl group having 1 to 25 carbon atoms, or an aryl group having 6 to 12 carbon atoms. R', when representing an alkyl group, is preferably an alkyl group having 1 to 30 carbon atoms. R', when representing an aryl group, is preferably an aryl group having 6 to 30 carbon atoms.

The phosphite is represented by triesters, diesters and monoesters of phosphorus acid, such as triphenyl phosphite, tris(nonylphenyl)phosphite, tris(2,4-di-tert-butylphenyl) phosphite, trinonyl phosphite, tridecyl phosphite, trioctyl phosphite, trioctadecyl phosphite, distearyl pentaerythritol diphosphite, tricyclohexyl phosphite, monobutyldiphenyl phosphite, monooctyldiphenyl phosphite, bis(2,4-di-tert-butylphenyl)pentaerythritol phosphite, bis(2,6-di-tert-butyl-4-methylphenyl)pentaerythritol phosphite, and 2,2-methylenebis(4,6-di-tert-butylphenyl)octyl phosphite.

When the resin composition of this invention contains the phosphorus-containing stabilizer, the amount of blending of the phosphorus-containing stabilizer, relative to 100 parts by weight of the resin component, is preferably 0.01 to 5 parts by weight, more preferably 0.05 to 0.1 parts by weight, and even more preferably 0.08 to 0.5 parts by weight.

With the content controlled to 0.01 parts by weight or more, the polycarbonate resin will effectively be suppressed from being decomposed due to the LDS additive, meanwhile with the content controlled to 5 parts by weight or less, the polycarbonate resin will be improved in the adhesiveness with the glass fiber, and thereby the strength may be improved.

In particular, when the resin component of the first embodiment is employed, the amount of blending of the phosphorus-containing stabilizer, relative to 100 parts by weight of the polycarbonate resin, preferably falls in the above-described ranges.

The resin composition of this invention may contain only a single species of the phosphorus-containing stabilizer, or may contain two or more species. When two or more species are contained, the total content falls in the above-described ranges.

In this invention, it is particularly preferable to blend, as the organophosphorus stabilizer, 0.01 to 1 parts by weight, and more preferably 0.05 to 0.5 parts by weight, of monostearyl acid phosphate and/or distearyl acid phosphate, relative to 100 parts by weight of the polycarbonate resin. With the content controlled to 0.01 parts by weight or more, the polycarbonate resin may remarkably be suppressed from being decomposed, meanwhile, with the content controlled to 1 part by weight or less, the polycarbonate resin may be improved in the adhesiveness with the glass fiber, and thereby the mechanical strength may be improved remarkably.

The resin composition of this invention may contain only a single species of the phosphorus-containing stabilizer, or may contain two or more species. When two or more species are contained, the total content preferably falls in the above-described ranges.

In this invention, it is particularly preferable to blend, as the organophosphorus stabilizer, 0.01 to 0.5 parts by weight, and more preferably contains 0.1 to 0.5 parts by weight, of monostearyl acid phosphate and/or distearyl acid phosphate, relative to 100 parts by weight of the polycarbonate resin. With the content controlled to 0.01 parts by weight or more, the polycarbonate resin may remarkably be suppressed from being decomposed, meanwhile, with the content controlled to 0.5 parts by weight or less, the polycarbonate resin may be improved in the adhesiveness with the glass fiber, and thereby the mechanical strength may be improved remarkably.

<Antioxidant>

The resin composition of this invention may contain an antioxidant. The antioxidant is preferably a phenolic antioxidant, and specifically exemplified by 2,6-di-t-butyl-4-methylphenol, n-octadecyl-3-(3,5-di-t-butyl-4'-hydroxyphenyl) propionate, tetrakis[methylene-3-(3,5-di-t-butyl-4-hydroxyphenyl) propionate]methane, tris(3,5-di-t-butyl-4-hydroxybenzyl) isocyanurate, 4,4'-butylidene-bis (3-methyl-6-t-butylphenol), triethylene glycol-bis[3-(3-t-butyl-hydroxy-5-methylphenyl) propionate], and 3,9-bis{2-[3-(3-t-butyl-4-hydroxy-5-methylphenyl)propionyloxy]-1,1-dimethylethyl}-2,4,8,10-tetraoxaspiro[5.5]undecane. Among them, tetrakis[methylene-3-(3,5-di-t-butyl-4-hydroxyphenyl) propionate]methane is preferable.

When the resin composition of this invention contains the antioxidant, the amount of blending of the antioxidant, relative to 100 parts by weight of the resin component, is preferably 0.01 to 5 parts by weight, and more preferably 0.05 to 3 parts by weight.

In particular, when the resin component of the first embodiment is employed, the amount of blending of the antioxidant, relative to 100 parts by weight of the polycarbonate resin, preferably falls in the above-described ranges.

The resin composition of this invention may contain only a single species of the antioxidant, or two or more species. When two or more species are contained, the total content preferably falls in the above-described ranges.

<Releasing Agent>

The resin composition of this invention may contain a releasing Agent. The releasing Agent is preferably at least one species of compound selected from aliphatic carboxylic acid, aliphatic carboxylate, and aliphatic hydrocarbon compound having a number average molecular weight of 200 to 15000. Among them, at least one species of compound selected from aliphatic carboxylic acid and aliphatic carboxylate is suitably used.

The aliphatic carboxylic acid is exemplified by saturated or unsaturated aliphatic monocarboxylic acid, dicarboxylic acid and tricarboxylic acid. In this specification, the term "aliphatic carboxylic acid" is used to encompass alicyclic carboxylic acid. Among the aliphatic carboxylic acids, mono- or dicarboxylic acid having 6 to 36 carbon atoms is preferable, and aliphatic saturated monocarboxylic acid having 6 to 36 carbon atoms is more preferable. Specific examples of such aliphatic carboxylic acid include palmitic acid, stearic acid, valeric acid, caproic acid, capric acid, lauric acid, arachic acid, behenic acid, lignoceric acid, cerotic acid, melissic acid, tetratriacontanoic acid, montanoic acid, glutaric acid, adipic acid, and azelaic acid.

The aliphatic carboxylic acid component which composes the aliphatic carboxylate may be same as the aliphatic carboxylic acid. Meanwhile, the alcoholic component which composes the aliphatic carboxylate is exemplified by saturated or unsaturated monohydric alcohol, and saturated or unsaturated polyhydric alcohol. These alcohols may have a substituent such as fluorine atom or aryl group. Among these alcohols, monohydric or polyhydric saturated alcohol having 30 or less carbon atoms is preferable, and, aliphatic saturated monohydric alcohol or polyhydric alcohol having 30 or less carbon atoms is more preferable. Now the aliphatic alcohol also encompasses alicyclic alcohol. Specific examples of these alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, di(trimethylolpropane), and dipentaerythritol. These aliphatic carboxylates may contain, as an impurity, aliphatic carboxylic acid and/or alcohol, or may be a mixture of a plurality of compounds. Specific examples of the aliphatic carboxylate include beeswax (mixture mainly composed of myricyl palmitate), stearyl stearate, behenyl behenate, octyldodecyl behenate, glycerin monopalmitate, glycerin monosterate, glycerin distearate, glycerin tristearate, pentaerythritol monopalmitate, pentaerythritol monostearate, pentaerythritol distearate, pentaerythritol tristearate, and pentaerythritol tetrastearate.

When the resin composition of this invention contains the releasing Agent, the amount of blending of the releasing Agent, relative to 100 parts by weight of the resin component, is preferably 0.01 to 5 parts by weight, and more preferably 0.05 to 3 parts by weight.

In particular, when the resin component of the first embodiment is employed, the amount of blending of the releasing Agent, relative to 100 parts by weight of the polycarbonate resin, preferably falls in the above-described ranges.

The resin composition of this invention may contain only a single species of the releasing Agent, or may contain two or more species. When two or more species are contained, the total content preferably falls in the above-described ranges.

The resin composition of this invention may contain additional ingredient(s), without departing from the spirit of this invention. The additional ingredient is exemplified by stabilizer other than the phosphorus-containing stabilizer, UV absorber, inorganic filler, fluorescent brightener, anti-static agent, anti-clouding agent, lubricant, anti-blocking agent, fluidity modifier, plasticizer, dispersion aid, and anti-bacterial agent. Two or more species of these ingredients may be used in combination.

As for these ingredients, the descriptions of JP-A-2007-314766, JP-A-2008-127485, JP-A-2009-51989 and JP-A-2012-72338 may be referred to, the contents of which are incorporated into this specification.

The method of manufacturing the polycarbonate resin composition of this invention is not specifically limited, and is widely selectable from known methods of manufacturing a thermoplastic resin composition. More specifically, the resin composition may be manufactured by preliminarily mixing the individual ingredients using any of various types of mixers such as tumbler and Henschel mixer, and then kneading them in a molten state using Banbury mixer, roll kneader, Brabender mixer, single screw kneading extruder, twin screw kneading extruder, or kneader.

Alternatively, the resin composition of this invention may be manufactured, without preliminarily mixing the individual ingredients; or by preliminarily mixing a part of the ingredients, and then by feeding the mixture using a feeder to an extruder for kneading in a molten state.

Even alternatively, the resin composition of this invention may be manufactured by preliminarily mixing a part of the ingredients, feeding the mixture to an extruder for kneading in a molten state, to thereby prepare a resin composition called master batch, and mixing the master batch again with the residual ingredients, followed by kneading in a molten state.

The phosphazene compound is preferably blended as the master batch, or in a predetermined granular form. Specific embodiments are exemplified as follows.

First Embodiment

As a first embodiment, exemplified is a master batch of flame retardant obtainable by melt-kneading 40 to 65% by weight of an aromatic polycarbonate resin (A) having a weight average molecular weight of 15000 to 55000, and 35 to 60% by weight of an aromatic phosphazene compound (B), in which the (A) component and the (B) component collectively account for 95 to 100% by weight. With such configuration, a master batch of flame retardant, showing a good workability when melt-kneaded with the resin, and ensuring high levels of flame retardancy and mechanical characteristics when blended into a thermoplastic resin, may be obtained.

Second Embodiment

As a second embodiment, exemplified is a master batch of flame retardant obtainable by melt-kneading an aromatic polycarbonate resin (A) having a weight average molecular weight of 5,000 to 55,000, and an aromatic phosphazene compound (B) using a pressure kneader. With such configuration, a master batch of flame retardant, ensuring high levels of retardancy and mechanical characteristics in an effective and stable manner, may be obtained.

Third Embodiment

As a third embodiment, exemplified is a master batch of flame retardant obtainable by melt-kneading 85 to 20% by weight of an aromatic polycarbonate resin (A) and 15 to 80% by weight of aromatic phosphazene compound (B), totaling 100 parts by weight, and 0.005 to 2 parts by weight of fluoropolymer (C). With such configuration, a master batch of flame retardant, showing a good workability when melt-kneaded with the resin, and ensuring high levels of flame retardancy and mechanical characteristics when blended into a thermoplastic resin, may be obtained.

Fourth Embodiment

A fourth embodiment relates to a granular phosphazene compound characterized by a ratio of oversize fraction on a 400 μm aperture sieve of 55% by weight or more, and a bulk density of 0.3 to 1.5 g/ml, which is blended in this form to the resin. The phosphazene compound, when configured in the form of fine powder at normal temperature, can solidify under compression or shearing, and without modification, it unfortunately tends to stick on an extruder screw in the process of melt-kneading together with the thermoplastic resin in an extruder. Now such sticking on the extruder screw and other nonconformities will be less likely to occur, if the phosphazene compound in the granular form is used.

Fifth Embodiment

A fifth embodiment relates to a granular phosphazene compound obtained by mixing a phosphazene compound (A) and a polycarbonate resin powder (B) characterized by a ratio of oversize fraction on a 1000 μm aperture sieve of 30% by weight or more, in a ratio by weight [(A)/(B)] of 85/15 to 5/95, and a bulk density of 0.4 to 1.5 g/ml, which is blended in this form to the resin. Such configuration ensures a good productivity, and a good workability when melt-kneaded with the thermoplastic resin.

Preferable embodiments of the resin composition of this invention are exemplified as follows.

(1) A resin composition which includes, relative to 100 parts by weight of a polycarbonate resin, 5 to 40 parts by weight of a glass fiber having a value of average fiber length/average fiber diameter of 10 or smaller; 0.5 to 10 parts by weight of an elastomer; 5 to 10 parts by weight of a laser direct structuring additive which contains antimony and tin; 10 to 30 parts by weight of a phosphazene compound; and 0.1 to 1 part by weight of polytetrafluoroethylene, in which the elastomer contains less than 10% by weight, relative to the total weight, of an acrylonitrile/butadiene/styrene copolymer, and the content of the acrylonitrile/butadiene/styrene copolymer is less than 10% by weight relative to the total content of the polycarbonate resin and the acrylonitrile/butadiene/styrene copolymer.

(2) A resin composition which includes, relative to 100 parts by weight of a resin component which contains 65 to 100% by weight of a polycarbonate resin and 35 to 0% by weight of a styrene-based resin, 5 to 40 parts by weight of a glass fiber having a value of average fiber length/average fiber diameter or 10 or smaller; 0.5 to 10 parts by weight of an elastomer; 5 to 10 parts by weight of a laser direct structuring additive which contains antimony and tin; 10 to 30 parts by weight of a phosphorus-containing flame retardant; and 0.1 to 1 part by weight of polytetrafluoroethylene.

(3) A resin composition which includes, relative to 90 parts by weight of a resin component which contains 65 to 100% by weight of a polycarbonate resin and 35 to 10% by weight of a styrene-based resin, 5 to 40 parts by weight of a glass fiber having a value of average fiber length/average fiber diameter or 10 or smaller; 0.5 to 10 parts by weight of an elastomer; 5 to 10 parts by weight of a laser direct structuring additive which contains antimony and tin; 10 to 30 parts by weight of a phosphorus-containing flame retardant; and 0.1 to 1 part by weight of polytetrafluoroethylene.

Methods of manufacturing a resin molded article are not specifically limited, and any method of molding for thermoplastic resin composition having generally been applied is arbitrarily selectable. Examples of the methods include injection molding, ultrahigh speed injection molding, injection compression molding, two-color molding, hollow molding typically based on a gas-assist process, molding method using heat-insulating dies, molding method using quick heating dies, foam molding (including supercritial fluid), insert molding, IMC (in-mold coating) forming, extrusion molding, sheet molding, heat molding, rotational molding, laminate molding, press molding and blow molding. Also a molding method based on a hot runner system may be used.

Next, a process of providing a plated layer on the surface of the resin molded article obtained by molding the resin composition of this invention will be explained referring to FIG. 1. FIG. 1 is a schematic drawing illustrating a process of forming a plated layer on the surface of a resin molded article 1, using a laser direct structuring technique. Note that the resin molded article 1, illustrated as a flat substrate in FIG. 1, is not always necessarily a flat substrate, and instead may be a partially, or totally curved resin molded article. The resin molded article conceptually covers not only a final product, but also various components. The resin molded article in this invention is preferably a component for a portable electronic device. The component for a portable electronic device is characterized by high levels of impact resistance, rigidity and heat resistance, and also by a low levels of anisotropy and warpage, and is therefore very suitable for internal structures and enclosures of electronic organizer, PDA such as portable computer, pager, mobile phone and PHS. It is particularly suitable for a component for a flat-shaped portable electronic device, in which the resin molded article, excluding ribs, has an average thickness of 1.2 mm or smaller (the lower limit is typically 0.4 mm or larger, although not specifically limited), and is particularly suitable for enclosures. The resin molded article of this invention is particularly beneficial because an antenna may be formed directly on the surface thereof.

The resin molded article is also suitable for applications for which the resin molded article, having an average thickness of 1.6 mm (and even 0.8 mm), is required to be rated V-0 in the UL-94 test.

Referring now back to FIG. 1, the resin molded article 1 is irradiated by laser 2. The laser in this context is suitably selectable, without special limitation, from known lasers such as YAG laser, excimer laser, and electromagnetic radiations, among them YAG laser is preferable. The wavelength of laser is not specifically limited. The wavelength range is preferably 200 nm to 1200 nm, and particularly 800 to 1200 nm.

Upon laser irradiation, the resin molded article 1 is activated only in a portion 3 irradiated by laser. The resin molded article 1 in the thus activated state is applied to a plating solution 4. The plating solution 4 is widely selectable from known plating solutions without special limitation, preferably from those mixed with a metal component such as copper, nickel, gold, silver or palladium, where copper is more preferable.

While the way the resin molded article 1 is applied to the plating solution 4 is not specifically limited, it is exemplified by a method of placing the resin molded article 1 into a solution in which a plating solution is blended. The resin molded article after applied with the plating solution (resin molded article with a plated layer) will have a plated layer 5 only in the laser-irradiated portion.

According to the method of this invention, a circuit pattern gap as wide as 1 mm or narrower, and even 150 μm or narrower may be formed (the lower limit value is typically 30 μm or above, although not specifically limited. In an exemplary process of plating, electroless plating may be followed by protection with nickel, and further with gold, for the purpose of suppressing corrosion or degradation of the circuit thus formed. Alternatively, such electroless plating may be followed by electroplating, so as to obtain a necessary thickness within a short time.

Moldings obtained from the resin composition of this invention are utilized for various applications including electronic parts such as connector, switch, relay and conductive circuit; reflective plate such as lamp reflector; frictional component such as gear and cam; automotive part such as air intake manifold; bathroom and kitchen, etc. where water is used, such as sink; various decorative parts; film; sheet; and fiber.

Although depending on the method of molding, the resin composition of this invention can yield moldings with high levels of whiteness and reflectivity. The whiteness (Hunter whiteness) of the molding obtained from the resin composition of this invention is typically 92 or above, and preferably 94 or above. The molding obtained from the resin composition of this invention shows high levels of heat resistance and light stability in the actual environment of use. The molding obtained from the resin composition of this invention can therefore act as apart functionalized to reflect light, in particular as a part of LED device, and preferably as a reflective plate or electroconductive circuit of LED. The plated layer may have either a single-layered or multi-layered structure.

Other descriptions of JP-A-2011-219620, JP-A-2011-195820, JP-A-2011-178873, JP-A-2011-168705 and JP-A-2011-148267 may be referred to, without departing from the spirit of this invention.

EXAMPLE

This invention will be described in further detail, referring to Examples. The materials, ratios of use, details of processes, procedures of processes and so forth may suitably be modified without departing from the spirit of this invention. The scope of this invention is therefore not limited to the specific examples described below.

<Resin Component>

Aromatic polycarbonate resin: Iupilon S-3000F, from Mitsubishi Engineering-Plastics Corporation AT-08: ABS resin, from Nippon A&L Inc.

<Elastomer>
Silicone-based elastomer: methyl methacrylate/methyl acrylate/dimethylsiloxane copolymer, S-2030, from Mitsubishi Rayon. Co., Ltd.
MB resin-based elastomer: M711, from Kaneka Corporation
<LDS Additive>
Antimony-doped tin oxide: CP5C, composed of 95 parts by weight tin oxide, 5 parts by weight of antimony oxide, 0.02 parts by weight lead oxide, and 0.004 parts by weight copper oxide, from Keeling & Walker Ltd.
<Antioxidant>
Octadecyl-3-(3,5-di-tert-butyl-4-hydroxyphenyl) propionate, Irganox 1076, from BASF
<Phosphorus-Containing Stabilizer>
Near equimolar mixture of mono- and di-stearyl acid phosphates, ADK STAB AX-71, from ADEKA Corporation
<Releasing Agent>
Pentaerythritol tetrastearate, VPG861, from Cognis Oleochemicals Japan Ltd.
<Polytetrafluoroethylene>
Fibril-forming fluoropolymer, 6-J, from Du Pont-Mitsui Fluorochemicals Co., Ltd.
<Titanium Oxide>
Titanium oxide: CP-K, from Resino Color Industry Co., Ltd.
<Phosphorus-Containing Flame Retardant>
Phenoxyphosphazene compound (phosphazene compound): FP-100, from Fushimi Pharmaceutical Co., Ltd.
PX-200 (condensed phosphoric ester): resorcinol bis-2,6-xylenyl phosphate, from Daihachi Chemical Industry Co., Ltd.
<Glass Fiber>
Glass fiber having a value of average fiber length/average fiber diameter exceeding 10: glass fiber T-187, from Nippon Electric Glass Co., Ltd., average fiber length=3 mm, average fiber diameter=13 µm, with a circular cross-section (flattening=1)
Glass fiber having a value of average fiber length/average fiber diameter of 10 or smaller (short fiber): glass fiber MF-SR, from Asahi Fiber Glass Co., Ltd., average fiber length=50 µm, average fiber diameter=10 µm, with a circular cross-section (flattening=1)

First Example

<Compound>
The individual ingredients were weighed according to the compositions summarized in Table described later, mixed in a tumbler for 20 minutes, fed to a single-vent, twin screw extruder (TEX 30HSST) from Japan Steel Works, Ltd., and kneaded at a rotating speed of screw of 200 rpm, a discharge rate of 20 kg/hour, and a barrel temperature of 300° C. The molten resin extruded in strands was quenched in a water bath, and pelletized using a pelletizer, to obtain pellets of the resin composition.
<Flame Retardancy (UL94)>
The pellets manufactured by the method described above were dried at 120° C. for 5 hours, injection-molded using an injection molding machine J50-EP from Japan Steel Works, Ltd. at a cylinder temperature of 290° C., and a die temperature of 80° C., to thereby obtain UL test specimens of 125 mm long, 13 mm wide and 0.8 mm thick.
The flame retardancy of the individual resin compositions was evaluated according to the UL94 test (the Standard for Safety of Flammability of Plastic Materials for Parts in Devices and Appliances testing) defined by Underwriters Laboratories (UL) of the USA, after conditioning the UL test specimens obtained by the method described above in a thermostat chamber at 23° C., 50% humidity for 48 hours. UL94V is a method of evaluating the flame retardancy based on the afterflame time and dripping tendency of the test specimens of a predetermined size, when held perpendicularly and brought into contact with flame of a burner for 10 seconds. Requirements to be met for flame retardancy ratings V-0, V-1 and V-2 are summarized in Table below.

TABLE 1

| | V-0 | V-1 | V-2 |
|---|---|---|---|
| Each specimen's afterflame time | 10 seconds or less | 30 seconds or less | 30 seconds or less |
| Total afterflame time of five specimens | 50 seconds or less | 250 seconds or less | 250 seconds or less |
| Cotton ignition due to drip | No | No | Yes |

Now the afterflame time is the length of time the test specimen continues to burn with flame, after an ignition source was brought away. Ignition of cotton under dripping is determined whether a cotton indicator, placed approximately 300 mm beneath the bottom edge of the test specimen, is ignited or not by the dripping of the test specimen. If any one of five specimens did not satisfy the criteria shown above, the resin composition was considered not to satisfy V-2, and denoted as NR (not rated).
<Flexural Modulus and Flexural Strength>
The pellets manufactured by the method described above were dried at 120° C. for 5 hours, and then injection-molded using SG75-MII from Sumitomo Heavy Industries, Ltd., at a cylinder temperature of 300° C., a die temperature of 100° C., and a molding cycle of 50 seconds, to thereby form ISO tensile test specimens of 4 mm thick.
According to ISO 178, the flexural modulus (in MPa) and flexural strength (in MPa) of the ISO tensile test specimens (4 mm thick) were measured at 23° C.
<Charpy Impact Strength>
Using the ISO tensile test specimens (4 mm thick) obtained above, notched Charpy impact strength was measured at 23° C., according to ISO 179.
<Deflection Temperature Under Load (DTUL)>
Using the ISO tensile test specimens (4 mm thick) obtained above, deflection temperature under load was measured according to ISO 75-1 and ISO 75-2 under a load of 1.80 MPa.
<Platability (LDS Activity)—Plating Index>
The pellets manufactured by the method described above were dried at 120° C. for 5 hours, and then injection-molded using SG75-MII from Sumitomo Heavy Industries, Ltd. at a cylinder temperature of 300° C., a die temperature of 100° C., and a molding cycle of 50 seconds, to thereby form plates of 3 mm thick.
On the thus obtained plates of 3 mm thick, YAG laser of 1064 nm wavelength was irradiated according to a character pattern, under various conditions based on combinations of the output selected in the range from 2.6 to 13 W, the scanning speed selected in the range from 1 to 2 m/s, and the frequency selected in the range from 10 to 50 is. The test specimens were then defatted with sulfuric acid, treated with THP Alkaliacti and THP Alkaliacce from Kizai Corporation, and plated using SEL Copper from Kizai Corporation. The plated test specimens were visually observed, and classified into any of five ranks below.

5: Clearly plated under 75 to 100% of various laser irradiation conditions
4: Clearly plated under 50 to 74% of various laser irradiation conditions
3: Clearly plated under 30 to 49% of various laser irradiation conditions
2: Clearly plated under 10 to 29% of various laser irradiation conditions
1: Clearly plated under less than 10% of various laser irradiation conditions
Results are Summarized in Table Below.

TABLE 2

|  |  | Comparative Example 1-1 | Comparative Example 1-2 | Example 1-1 | Example 1-2 | Example 1-3 | Example 1-4 |
|---|---|---|---|---|---|---|---|
| Materials (Unit: parts by mass) | PC resin | 100.0 | 100.0 | 100.0 | 100.0 | 100.0 | 100.0 |
|  | Si-based elastomer | 5.2 | 0.0 | 4.4 | 5.2 | 5.2 | 0.0 |
|  | MB resin-based elastomer | 0.0 | 0.0 | 0.0 | 0.0 | 0.0 | 4.4 |
|  | LDS Additive (Antimony-doped tin oxide) | 6.9 | 5.6 | 5.9 | 6.9 | 6.9 | 5.9 |
|  | Antioxidant | 0.2 | 0.1 | 0.1 | 0.2 | 0.2 | 0.1 |
|  | Phosphorus-containing stabilizer | 0.2 | 0.1 | 0.1 | 0.2 | 0.2 | 0.1 |
|  | Releasing Agent | 0.5 | 0.4 | 0.4 | 0.5 | 0.5 | 0.4 |
|  | Polytetrafluoroethylene | 0.7 | 0.6 | 0.6 | 0.7 | 0.7 | 0.6 |
|  | Titanium Oxide | 3.4 | 2.8 | 2.9 | 3.4 | 3.4 | 2.9 |
|  | Phosphazene compund | 20.7 | 16.9 | 17.6 | 20.7 | 20.7 | 17.6 |
|  | Glass fiber having a value of average fiber length/average fiber diameter exceeding 10 | 34.4 | 0.0 | 0.0 | 17.2 | 0.0 | 0.0 |
|  | Glass fiber having a value of average fiber length/average fiber diameter of 10 or smaller | 0.0 | 17.2 | 17.2 | 17.2 | 34.4 | 17.2 |
| Characteristics | Flame Retardancy (UL 94) at thickness of 0.8 mm | V-2 | V-0 | V-0 | V-0 | V-0 | V-0 |
|  | Flexural Modulus (Unit: Mpa) | 6230 | 2800 | 2800 | 4830 | 3760 | 2800 |
|  | Flexural Strength (Unit: Mpa) | 115 | 87 | 77 | 100 | 73 | 75 |
|  | Charpy Impact Strength (Unit: kJ/m$^2$) | 8.0 | 5.0 | 10.0 | 9.0 | 12.0 | 10.0 |
|  | Deflection Temperature under Load (DTUL) (Unit: ° C.) | 91 | 90 | 90 | 94 | 90 | 90 |
|  | Plating index | 4 | 4 | 5 | 5 | 4 | 5 |

As is clear from the results above, the resin compositions of this invention showed good flame retardancy, while keeping high levels of mechanical strength and platability (Examples 1-1 to 1-4).

In contrast, the flame retardancy was found poor when only a glass fiber characterized by a value of average fiber length/average fiber diameter exceeding 10 was used as the glass fiber (Comparative Example 1). A UL test specimen of 1.6 mm thickness, molded using the resin composition of Comparative Example 1 in the same way as the above-described UL test specimen, was rated V-1 for flame retardancy.

The Charpy impact strength was found poor, when the elastomer was not blended (Comparative Example 2).

It was also found that the flexural modulus and flexural strength were further improved, when the glass fiber having a value of average fiber length/average fiber diameter exceeding 10 was mixed in the ratio of 100% by weight or less, relative to the amount of blending of the short fiber having a value of average fiber length/average fiber diameter of 10 or smaller (Example 1-2).

It was also found that the platability was further improved, when the amount of blending of the short fiber having a value of average fiber length/average fiber diameter of 10 or smaller was controlled to 30 parts by weight or less, relative to 100 parts by weight of the polycarbonate resin (Examples 1-1, 1-2, 1-4).

Second Example

Compound (Examples 2-2 to 2-5, Comparative Examples 2-1 to 2-4)

The individual ingredients were weighed according to the compositions summarized in Table described later, mixed in a tumbler for 20 minutes, fed to a single-vent, twin screw extruder (TEX 30HSST) from Japan Steel Works, Ltd., and kneaded at a rotating speed of screw of 200 rpm, a discharge rate of 20 kg/hour, and a barrel temperature of 280° C. The molten resin extruded in strands was quenched in a water bath, and pelletized using a pelletizer, to obtain pellets of the resin composition.

Compound (Example 2-1)

The individual ingredients were weighed according to the compositions summarized in Table described later, and pellets of the resin composition were obtained in the same way as in the First Example described above.
<Flame Retardancy (UL94V)>
The pellets manufactured by the method described above were dried at 120° C. for 5 hours, and then injection-molded using an injection molding machine Model J50-EP from Japan Steel Works, Ltd. at a cylinder temperature of 290° C., and a die temperature of 80° C., to thereby form UL test specimens of 125 mm long, 13 mm wide and 1.6 mm thickness.

The flame retardancy of the individual resin compositions was evaluated in the same way as in First Example described above, using the UL test specimens obtained as described above.
<Flexural Modulus and Flexural Strength>
ISO tensile test specimens (4 mm thick) were formed in the same way as in First Example, using the pellets obtained by the method of manufacturing described above, and the flexural modulus and flexural strength were evaluated.
<Charpy Impact Strength>
Using the ISO tensile test specimens (4 mm thick) obtained above, notched Charpy impact strength was measured at 23° C., according to ISO 179.

<Deflection Temperature Under Load (DTUL)>

Using the ISO tensile test specimens (4 mm thick) obtained above, deflection temperature under load was measured according to ISO 75-1 and ISO 75-2 under a load of 1.80 MPa.

<Platability>

The pellets of Examples 2-2 to 2-5 and Comparative Examples 2-1 to 2-4, manufactured by the method described above, were dried at 100° C. for 5 hours, and then injection-molded using SG75-MII from Sumitomo Heavy Industries, Ltd. at a cylinder temperature of 280° C., a die temperature of 80° C., and a molding cycle of 50 seconds, to thereby form plates of 3 mm thick.

On the thus obtained plates of 3 mm thick, YAG laser of 1064 nm wavelength was irradiated according to a character pattern, under various conditions based on combinations of the output selected in the range from 2.6 to 13 W, the scanning speed selected in the range from 1 to 2 m/s, and the frequency selected in the range from 10 to 50 ps. The test specimens were then defatted with sulfuric acid, treated with THP Alkaliacti and THP Alkaliacce from Kizai Corporation, and plated using SEL Copper from Kizai Corporation. The plated test specimens were visually observed, and classified into any of five ranks explained above in First Example.

Results are summarized in Table below.

found to have high levels of various mechanical characteristics including flexural modulus, flexural strength, Charpy impact strength, and deflection temperature under load, and a high level of flame retardancy, while keeping a good platability. In contrast, under a large amount of blending of styrene resin, the flame retardancy was found poor, even if the amount of blending of the glass fiber having a value of average fiber length/average fiber diameter of 10 or smaller was increased (Comparative Example 2-1). The flame retardancy was found poor, also when the amount of blending of glass fiber having a value of average fiber length/average fiber diameter of 10 or smaller fell outside the range specified in this invention (Comparative Examples 2-2 to 2-4).

Third Example

<Compound>

Pellets of the resin composition, according to the compositions summarized in Table described later, were obtained in the same way as the compounds explained above in Second Example (Examples 2-2 to 2-5, and Comparative Examples 2-1 to 2-4).

<Flame Retardancy (UL94V)>

The pellets manufactured by the method described above were dried at 120° C. for 5 hours, and then injection-molded

TABLE 3

| | | | Example 2-1 | Example 2-2 | Example 2-3 | Example 2-4 | Example 2-5 |
|---|---|---|---|---|---|---|---|
| Materials (parts by mass) | PC resin | S-3000F | 100.0 | 85.0 | 70.0 | 85.0 | 92.0 |
| | ABS resin | AT-08 | 0.0 | 15.0 | 30.0 | 15.0 | 8.0 |
| | Milled fiber | MF-SR | 15.4 | 15.4 | 15.4 | 36.2 | 16.7 |
| | Glass fiber (circular cross-section) | T-187 | 0.0 | 0.0 | 0.0 | 0.0 | 8.3 |
| | Elastomer | S-2030 | 4.6 | 4.6 | 4.6 | 5.4 | 4.8 |
| | LDS Additive | CP5C | 6.1 | 6.1 | 6.1 | 7.2 | 6.4 |
| | Flame retardant (phosphoric ester) | PX-200 | 23.0 | 23.0 | 23.0 | 27.2 | 26.0 |
| | PTFE | 6-J | 0.6 | 0.6 | 0.6 | 0.7 | 0.6 |
| | Antioxidant | Irg1076 | 0.1 | 0.1 | 0.1 | 0.2 | 0.2 |
| | Phosphorus-containing stabilizer | AX-71 | 0.1 | 0.1 | 0.1 | 0.2 | 0.2 |
| | Releasing Agent | VPG861 | 0.4 | 0.4 | 0.4 | 0.5 | 0.5 |
| | Titanium Oxide | CP-K | 3.1 | 3.1 | 3.1 | 3.7 | 3.2 |
| Characteristics | UL 94V | 1.6 mm | V-0 | V-0 | V-0 | V-0 | V-0 |
| | Flexural Modulus | MPa | 2860 | 2860 | 2910 | 3760 | 4200 |
| | Flexural Strength | MPa | 78 | 78 | 76 | 85 | 91 |
| | Charpy Impact Strength | kJ/m$^2$ | 7.0 | 6.5 | 6.6 | 5.9 | 6.0 |
| | Deflection Temperature under Load (DTUL) | ° C. | 82 | 82 | 81 | 83 | 78 |
| | Plating index | | 4 | 5 | 5 | 5 | 4 |

| | | | Comparative Example 2-1 | Comparative Example 2-2 | Comparative Example 2-3 | Comparative Example 2-4 |
|---|---|---|---|---|---|---|
| Materials (parts by mass) | PC resin | S-3000F | 60.0 | 85.0 | 91.2 | 85.0 |
| | ABS resin | AT-08 | 40.0 | 15.0 | 8.8 | 15.0 |
| | Milled fiber | MF-SR | 15.4 | 4.0 | 0.0 | 48.2 |
| | Glass fiber (circular cross-section) | T-187 | 0.0 | 32.2 | 36.2 | 0.0 |
| | Elastomer | S-2030 | 4.6 | 5.4 | 5.3 | 5.8 |
| | LDS Additive | CP5C | 6.1 | 7.2 | 7.2 | 7.2 |
| | Flame retardant (phosphoric ester) | PX-200 | 23.0 | 27.2 | 27.2 | 27.2 |
| | PTFE | 6-J | 0.6 | 0.7 | 0.7 | 0.7 |
| | Antioxidant | Irg1076 | 0.1 | 0.2 | 0.2 | 0.2 |
| | Phosphorus-containing stabilizer | AX-71 | 0.1 | 0.2 | 0.2 | 0.2 |
| | Releasing Agent | VPG861 | 0.4 | 0.5 | 0.5 | 0.5 |
| | Titanium Oxide | CP-K | 3.1 | 3.7 | 3.7 | 3.7 |
| Characteristics | UL 94V | 1.6 mm | V-2 | V-2 | V-2 | V-1 |
| | Flexural Modulus | MPa | 2870 | 6300 | 6600 | 3300 |
| | Flexural Strength | MPa | 78 | 110 | 121 | 95 |
| | Charpy Impact Strength | kJ/m$^2$ | 6.6 | 5.5 | 5.0 | 4.0 |
| | Deflection Temperature under Load (DTUL) | ° C. | 82 | 81 | 81 | 81 |
| | Plating index | | 5 | 5 | 3 | 4 |

As is clear from Table above, when the compositions of this invention were used, the obtained test specimens were using an injection molding machine Model J50-EP from Japan Steel Works, Ltd., at a cylinder temperature of 290°

C., and a die temperature of 80° C., to thereby form UL test specimens of 125 mm long, 13 mm wide and 1.6 mm thickness.

plated test specimens were visually observed, and classified into any of five ranks explained above in First Example.

Results are summarized in Table below.

TABLE 4

|  |  |  | Example 3-1 | Example 3-2 | Example 3-3 | Example 3-4 | Example 3-5 | Comparative Example 3-1 | Comparative Example 3-2 | Comparative Example 3-3 |
|---|---|---|---|---|---|---|---|---|---|---|
| Materials (parts by mass) | PC resin | S-3000F | 87.0 | 80.0 | 70.0 | 87.0 | 87.0 | 60.0 | 87.0 | 87.0 |
|  | ABS resin | AT-08 | 13.0 | 20.0 | 30.0 | 13.0 | 13.0 | 40.0 | 13.0 | 13.0 |
|  | Milled fiber | MF-SR | 14.9 | 14.9 | 14.9 | 34.8 | 26.1 | 14.9 | 0.0 | 3.5 |
|  | Glass fiber (circular cross-section) | T-187 | 0.0 | 0.0 | 0.0 | 0.0 | 8.7 | 0.0 | 14.9 | 35.6 |
|  | Elastomer | S-2030 | 4.5 | 4.5 | 4.5 | 5.3 | 5.3 | 4.5 | 4.5 | 4.8 |
|  | LDS Additive | CP5C | 6.0 | 6.0 | 6.0 | 6.0 | 6.0 | 6.0 | 6.0 | 7.5 |
|  | Flame Retardant (phosphazene) | FP-100 | 19.4 | 19.4 | 19.4 | 22.8 | 22.8 | 19.4 | 19.4 | 20.9 |
|  | PTFE | 6-J | 0.6 | 0.6 | 0.6 | 0.7 | 0.7 | 0.6 | 0.6 | 0.6 |
|  | Antioxidant | Irg1076 | 0.1 | 0.1 | 0.2 | 0.2 | 0.2 | 0.1 | 0.1 | 0.2 |
|  | Phosphorus-containing stabilizer | AX-71 | 0.1 | 0.1 | 0.2 | 0.2 | 0.2 | 0.1 | 0.1 | 0.2 |
|  | Releasing Agent | VPG861 | 0.4 | 0.4 | 0.5 | 0.5 | 0.5 | 0.4 | 0.4 | 0.5 |
|  | Titanium Oxide | CP-K | 3.0 | 3.0 | 3.0 | 3.5 | 3.5 | 3.0 | 3.0 | 3.6 |
| Characteristics | UL 94V | 1.6 mm | V-0 | V-0 | V-0 | V-0 | V-0 | V-2 | V-2 | V-2 |
|  | Flexural Modulus | MPa | 2730 | 2890 | 2900 | 3760 | 4370 | 2860 | 3200 | 6010 |
|  | Flexural Strength | MPa | 79 | 78 | 75 | 83 | 95 | 79 | 79 | 110 |
|  | Charpy Impact Strength | kJ/m$^2$ | 9.2 | 10.5 | 10.0 | 10.0 | 7.6 | 11.5 | 9.0 | 7.0 |
|  | Deflection Temperature under Load (DTUL) | ° C. | 91 | 92 | 92 | 93 | 92 | 88 | 90 | 90 |
|  | Plating index |  | 4 | 4 | 5 | 4 | 5 | 4 | 3 | 5 |

The flame retardancy of the individual resin compositions was evaluated in the same way as in First Example described above, using the UL test specimens obtained as described above.

<Flexural Modulus and Flexural Strength>

ISO tensile test specimens (4 mm thick) were formed in the same way as in First Example, using the pellets obtained by the method of manufacturing described above, and the flexural modulus and flexural strength were evaluated.

<Charpy Impact Strength>

Using the ISO tensile test specimens (4 mm thick) obtained above, notched Charpy impact strength was measured at 23° C., according to ISO 179.

<Deflection Temperature Under Load (DTUL)>

Using the ISO tensile test specimens (4 mm thick) obtained above, deflection temperature under load was measured according to ISO 75-1 and ISO 75-2 under a load of 1.80 MPa.

<Platability>

The pellets of the individual Examples and the individual Comparative Examples, manufactured by the method described above, were dried at 100° C. for 5 hours, and then injection-molded using SG75-MII from Sumitomo Heavy Industries, Ltd., at a cylinder temperature of 280° C., a die temperature of 80° C., and a molding cycle of 50 seconds, to thereby form plates of 3 mm thick.

On the thus obtained plates of 3 mm thick, YAG laser of 1064 nm wavelength was irradiated according to a character pattern, under various conditions based on combinations of the output selected in the range from 2.6 to 13 W, the scanning speed selected in the range from 1 to 2 m/s, and the frequency selected in the range from 10 to 50 μs. The test specimens were then defatted with sulfuric acid, treated with THP Alkaliacti and THP Alkaliacce from Kizai Corporation, and plated using SEL Copper from Kizai Corporation. The As is clear from Table above, when the compositions of this invention were used, the obtained test specimens were found to have high levels of various mechanical characteristics including flexural modulus, flexural strength, Charpy impact strength, and deflection temperature under load, and a high level of flame retardancy, while keeping a good platability. In contrast, the flame retardancy was found poor, when the amount of blending of the polycarbonate resin was small (Comparative Example 1), and when the amount of blending of the glass fiber having a value of average fiber length/average fiber diameter of 10 or smaller fell outside the range specified in this invention (Comparative Examples 3-2, 3-3).

The invention claimed is:

1. A resin composition for laser direct structuring, the resin composition comprising:
    relative to 100 parts by weight of a resin component which contains 65 to 100% by weight of a polycarbonate resin and 35 to 0% by weight of a styrene-based resin,
    5 to 40 parts by weight of a glass fiber having a value of average fiber length/average fiber diameter of 10 or smaller;
    0.5 to 10 parts by weight of an elastomer;
    5 to 10 parts by weight of a laser direct structuring additive containing antimony and tin;
    10 to 30 parts by weight of a phosphorus-containing flame retardant; and,
    0.1 to 1 part by weight of polytetrafluoroethylene.
2. The resin composition of claim 1,
    wherein the phosphorus-containing flame retardant is a phosphazene compound and/or a condensed phosphoric ester.

3. The resin composition claim 1, the resin composition comprising:
   relative to 100 parts by weight of the polycarbonate resin,
   5 to 40 parts by weight of the glass fiber having a value of average fiber length/average fiber diameter of 10 or smaller;
   0.5 to 10 parts by weight of the elastomer;
   5 to 10 parts by weight of the laser direct structuring additive containing antimony and tin;
   10 to 30 parts by weight of a phosphazene compound as the phosphorus-containing flame retardant; and,
   0.1 to 1 part by weight of the polytetrafluoroethylene,
   wherein a content of an acrylonitrile/butadiene/styrene copolymer in the elastomer is less than 10% by weight, and
   a content of the acrylonitrile/butadiene/styrene copolymer is less than 10% by weight, relative to a total content of the polycarbonate resin and the acrylonitrile/butadiene/styrene copolymer.

4. The resin composition of claim 3,
   which comprises the glass fiber having a value of average fiber length/average fiber diameter of 10 or smaller in a content of 5 to 20 parts by weight, relative to 100 parts by weight of the polycarbonate resin.

5. The resin composition of claim 3,
   further comprising 0.5 to 5 parts by weight of titanium oxide, relative to 100 parts by weight of the polycarbonate resin.

6. The resin composition of claim 3,
   wherein the resin composition contains substantially no acrylonitrile/butadiene/styrene copolymer.

7. The resin composition of claim 1,
   wherein the phosphorus-containing flame retardant is a condensed phosphoric ester.

8. The resin composition of claim 7,
   wherein a content of blending of the styrene-based resin, in the resin component, is less than 10% by weight.

9. The resin composition of claim 1,
   wherein the resin component comprises 65 to 90% by weight of the polycarbonate resin and 35 to 10% by weight of the styrene-based resin, and, the phosphorus-containing flame retardant is a phosphazene compound.

10. The resin composition of claim 7,
    which comprises the glass fiber having a value of average fiber length/average fiber diameter of 10 or smaller in a content of 5 to 30 parts by weight, relative to 100 parts by weight of the resin component.

11. The resin composition of claim 7,
    further comprising 0.5 to 5 parts by weight of titanium oxide, relative to 100 parts by weight of the resin component.

12. The resin composition of claim 1,
    wherein tin is the most abundant ingredient among metal components contained in the laser direct structuring additive.

13. The resin composition of claim 1,
    wherein the laser direct structuring additive contains 90% by weight or more of tin oxide, and 3 to 8% by weight of antimony oxide.

14. The resin composition of claim 1,
    wherein the laser direct structuring additive contains 0.01 to 0.1% by weight of lead oxide and/or 0.001 to 0.01% by weight of copper oxide.

15. The resin composition of claim 1,
    wherein the elastomer is a siloxane-copolymerized elastomer.

16. The resin composition of claim 1,
    further comprising a glass fiber having a value of average fiber length/average fiber diameter exceeding 10, whose content being 100% by weight or less relative to the amount of blending of the glass fiber having a value of average fiber length/average fiber diameter of 10 or smaller.

17. A resin molded article obtained by molding the resin composition described in claim 1.

18. The resin molded article of claim 17, rated V-0 in the UL 94 test at 1.6 mm thickness.

19. The resin molded article of claim 17, further comprising a plated layer on a surface of the resin molded article.

20. The resin molded article of claim 19, wherein the plated layer has antenna performance.

21. A method of manufacturing a resin molded article with a plated layer, the method comprising irradiating laser to a surface of a resin molded article obtained by forming the resin composition of claim 1, and applying a metal to form the plated layer.

22. The method of manufacturing a resin molded article with a plated layer of claim 21, wherein the plated layer is a copper plated layer.

23. A method of manufacturing a component for a portable electronic device, the method comprising the method of manufacturing a resin molded article with a plated layer described in claim 21.

* * * * *